United States Patent
Marinier et al.

(10) Patent No.: US 10,630,437 B2
(45) Date of Patent: *Apr. 21, 2020

(54) METHOD AND APPARATUS FOR NON-ORTHOGONAL ACCESS IN LTE SYSTEMS

(71) Applicant: InterDigital Patent Holdings, Inc., Wilmington, DE (US)

(72) Inventors: Paul Marinier, Brossard (CA); Benoit Pelletier, Roxboro (CA); J. Patrick Tooher, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/274,422

(22) Filed: Feb. 13, 2019

(65) Prior Publication Data

US 2019/0245662 A1 Aug. 8, 2019

Related U.S. Application Data

(63) Continuation of application No. 15/126,142, filed as application No. PCT/US2015/020541 on Mar. 13, 2015, now Pat. No. 10,250,362.

(Continued)

(51) Int. Cl.
*H04L 5/00* (2006.01)
*H04W 72/04* (2009.01)
(Continued)

(52) U.S. Cl.
CPC .......... *H04L 5/0044* (2013.01); *H04W 72/02* (2013.01); *H04W 72/042* (2013.01);
(Continued)

(58) Field of Classification Search
None
See application file for complete search history.

(56) References Cited

U.S. PATENT DOCUMENTS

| 5,943,344 A | 8/1999 | Keller et al. |
| 6,181,947 B1 * | 1/2001 | Du .................. H04W 72/0446 370/336 |

(Continued)

FOREIGN PATENT DOCUMENTS

EP 0981926 B1 7/2006

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN);Overall description; Stage 2 (Release 11)", 3GPP TS 36.300 V11.7.0, Sep. 2009, 209 pages.

(Continued)

*Primary Examiner* — Duc T Duong
(74) *Attorney, Agent, or Firm* — Yin Shao

(57) ABSTRACT

The disclosure pertains to methods and apparatus for transmitting uplink data to a wireless network asynchronously comprising generating data for transmission to the network on an uplink shared channel (UL-SCH) transport channel, selecting between transmitting the data to the network orthogonally or non-orthogonally, and transmitting the data on the selected physical channel.

19 Claims, 17 Drawing Sheets

Related U.S. Application Data

(60) Provisional application No. 61/968,055, filed on Mar. 20, 2014.

(51) Int. Cl.
*H04W 72/02* (2009.01)
*H04W 28/06* (2009.01)
*H04W 74/00* (2009.01)

(52) U.S. Cl.
CPC ........... *H04L 5/0055* (2013.01); *H04W 28/06* (2013.01); *H04W 74/00* (2013.01)

(56) References Cited

U.S. PATENT DOCUMENTS

| | | | |
|---|---|---|---|
| 2007/0076649 A1* | 4/2007 | Lin | H04W 76/15 370/328 |
| 2008/0039133 A1* | 2/2008 | Ma | H04L 27/2626 455/552.1 |
| 2009/0022093 A1 | 1/2009 | Nabar et al. | |
| 2009/0201865 A1 | 8/2009 | Uemura et al. | |
| 2009/0290570 A1* | 11/2009 | Kishiyama | H04B 1/59 370/344 |
| 2009/0316630 A1 | 12/2009 | Yamada et al. | |
| 2010/0098051 A1 | 4/2010 | Uemura | |
| 2012/0120858 A1* | 5/2012 | Das | H04W 52/0229 370/311 |
| 2013/0100948 A1 | 4/2013 | Irvine | |
| 2013/0294388 A1 | 11/2013 | Kawasaki et al. | |
| 2013/0315108 A1* | 11/2013 | Lindner | H04W 4/08 370/277 |
| 2015/0098372 A1* | 4/2015 | Zavadsky | H04W 88/085 370/281 |
| 2017/0013565 A1* | 1/2017 | Pelletier | H04W 52/343 |

OTHER PUBLICATIONS

"3rd Generation Partnership Project; Technical Specification Group Radio Access Network; Evolved Universal Terrestrial Radio Access (E-UTRA); LTE physical layer; General description (Release 11)", 3GPP TS 36.201 V11.1.0, Dec. 2012, 13 pages.

"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.0.0, Dec. 2013, 57 pages.

"3rd Generation Partnership Project; Technical Specification Group Radio Access Network; Evolved Universal Terrestrial Radio Access (E-UTRA); Physical channels and modulation (Release 12)", 3GPP TS 36.211 V12.0.0, Dec. 2013, 120 pages.

"International Search Report and Written Opinion", PCT Application No. PCT/US2015/020541, dated Jun. 5, 2015, 11 pages.

Bellanger, M., et al., "FBMC physical layer: a primer", Physical Layer for Dynamic Spectrum Access and Cognitive Radio (PHYDYAS), http://www.ict-phydyas.org/teamspace/internal-folder/FBMC-Primer_06-2010.pdf., Jun. 2010, 31 pages.

\* cited by examiner

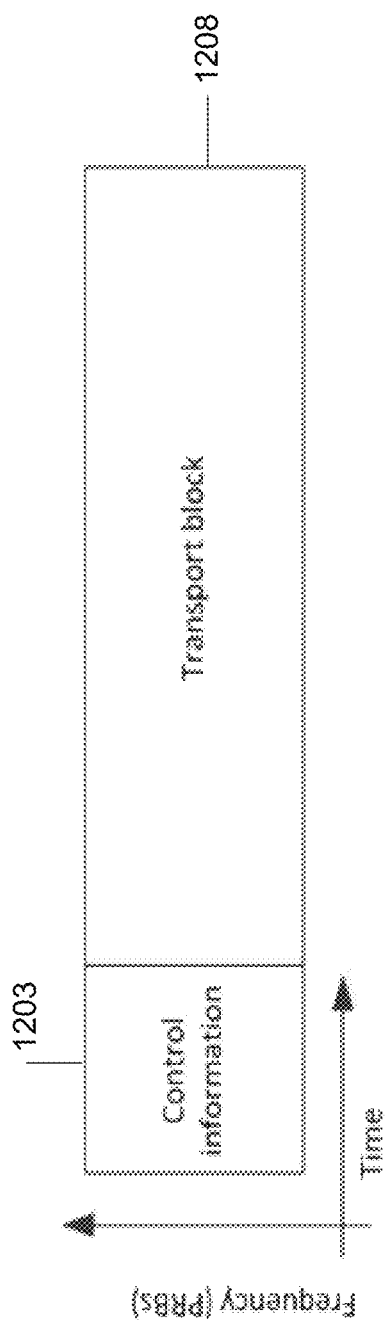
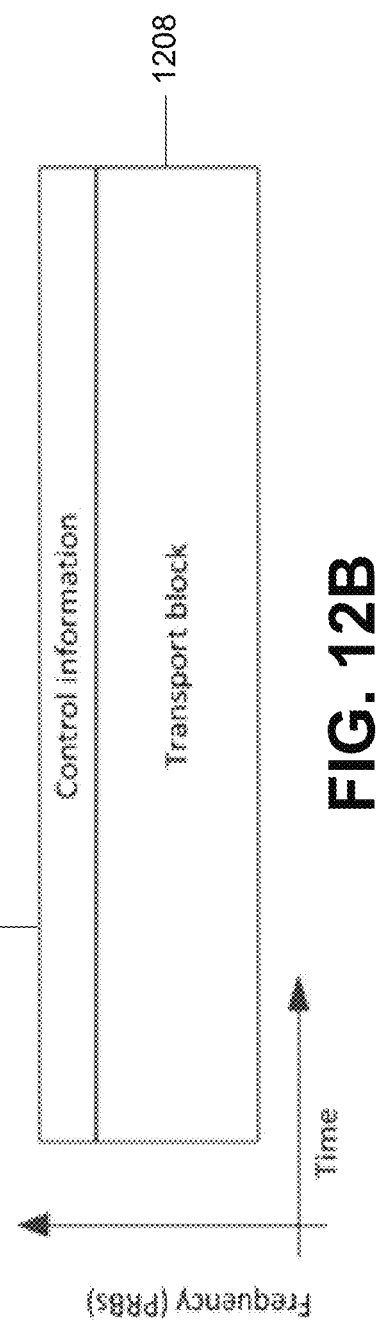
FIG. 12A
FIG. 12B

METHOD AND APPARATUS FOR NON-ORTHOGONAL ACCESS IN LTE SYSTEMS

RELATED APPLICATION

This application is a continuation application of U.S. patent application Ser. No. 15/126,142, filed Sep. 14, 2016, which is a 371 U.S. National Stage entry of PCT Application No. PCT/US2015/020541, filed Mar. 13, 2015, which is a non-provisional application of U.S. provisional patent application No. 61/968,055, filed Mar. 20, 2014, the content of which is incorporated herein fully by reference.

FIELD OF THE INVENTION

This application relates to methods and apparatus for User Equipment (UE), such as a Wireless Transmit Receive Unit (WTRU) to transmit uplink data without having to strictly synchronize with the network.

BACKGROUND

Currently, mobile wireless communication systems based on LTE provide broadband access to a variety of devices supporting an ever increasing number of applications, e.g., voice communications, text messaging, social applications, e-mail, web browsing, online payment, and other industrial/commercial type of applications. The traffic characteristics originating from these devices has never been more varied.

Current LTE systems are based on Orthogonal Frequency Division Multiplexing (OFDM) and therefore rely on tight control of timing of UEs to guarantee orthogonality between Single Frequency-Frequency Division Multiple Access (SC-FDMA) signals from different UEs. While small timing errors can be corrected for by using known signal processing techniques that exploit the OFDM cyclic prefix, larger timing differences between UEs can lead to unrecoverable overlap between the subcarriers causing significant performance degradation.

The requirement for tight timing control for uplink access leads to significant overhead both in terms of signaling and eNB processing load. For example, a UE in Idle mode or a UE that has no valid timing advance has to first transmit a RACH preamble and receive an acknowledgement with the associated timing advance and grant before it can transmit any information to the network. While this overhead may be justified when connections are relatively long-lasting (i.e., when a substantial amount of data will be transmitted uplink over the connection), it may not be justified when the connection is used to transmit a very small amount of data, as is the case for many new applications, such as machine-to-machine (M2M) applications.

SUMMARY

In accordance with one aspect, the invention pertains to methods and apparatus implemented in a UE for transmitting data to a wireless network asynchronously including generating data for transmission to the network on an uplink shared channel (UL-SCH) transport channel, selecting between transmitting the data to the network orthogonally or non-orthogonally, and transmitting the data on the selected physical channel.

In accordance with another aspect, the invention pertains to methods and apparatus implemented in an e Node B (eNB) for communicating with a User Equipment (UE) asynchronously comprising: receiving first uplink data from a UE on a synchronous physical uplink shared channel (PUSCH) and receiving second uplink data from the UE on an asynchronous physical uplink shared channel (PAUSCH).

BRIEF DESCRIPTION OF THE DRAWINGS

A more detailed understanding may be had from the following description, given by way of example in conjunction with the accompanying drawings, wherein:

FIGS. 12A and 12B illustrate two alternative data structures for the data portion of the APRACH shown in FIG. 11;

DETAILED DESCRIPTION

A detailed description of illustrative embodiments will now be provided with reference to the various figures. Although this description provides detailed examples of possible implementations, it should be noted that the details are intended to be exemplary and in no way limit the scope of the invention. In addition, the figures may illustrate message sequence charts, which are meant to be exemplary. Other embodiments may be used. The order of the messages may be varied where appropriate. Messages may be omitted if not needed, and, additional flows may be added.

1 IMPROVEMENTS TO LTE MODULATION SCHEME

The requirement for tight timing of LTE modulation can be overcome by evolved or filtered multi-carrier techniques, such as filterbank multicarrier (FMBC) or generalized frequency division multiplexing (GFDM), at the possible cost of higher implementation complexity. While in OFDM the orthogonality between all subcarriers must be ensured, such evolved multi-carrier techniques may require orthogonality only between adjacent subcarriers, which is ensured via an appropriate choice of modulation technique. For example, a combination of offset QAM (OQAM) modulation with FBMC (with existing filter design) may lead to the same maximum bit rates as is possible with OFDM without the need for tight synchronization.

Figure 1:
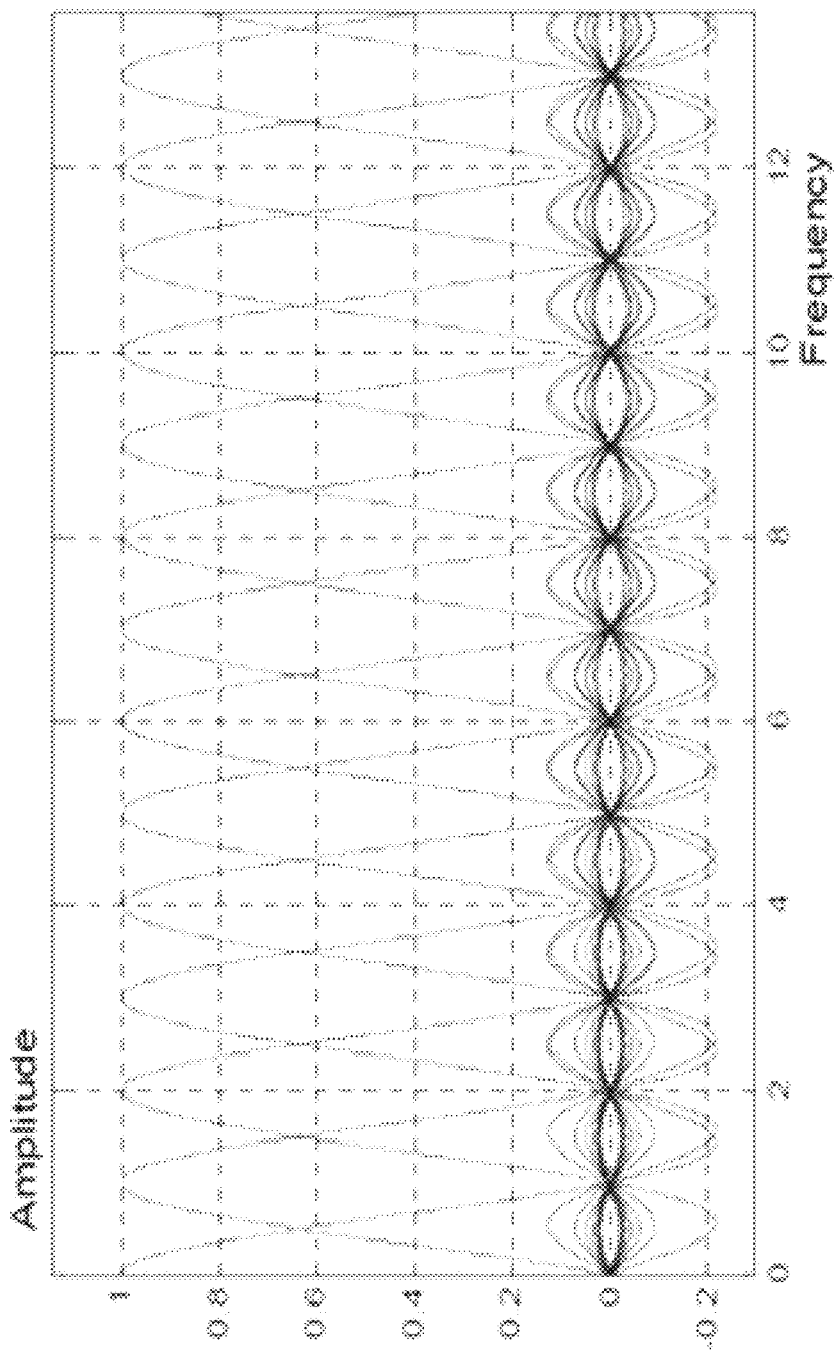
FIG. 1 is a graph showing the amplitude of an OFDM signal over a span of multiple subcarriers.

FIG. 1 shows the amplitude of an OFDM signal over a span of multiple subcarriers. As can be observed, the signals from different subcarriers do not interfere (zero amplitude) at the integer frequency indices. Furthermore, as the modulation is completely orthogonal the overlap between subcarriers is canceled by the property of the signal.

Figure 2:
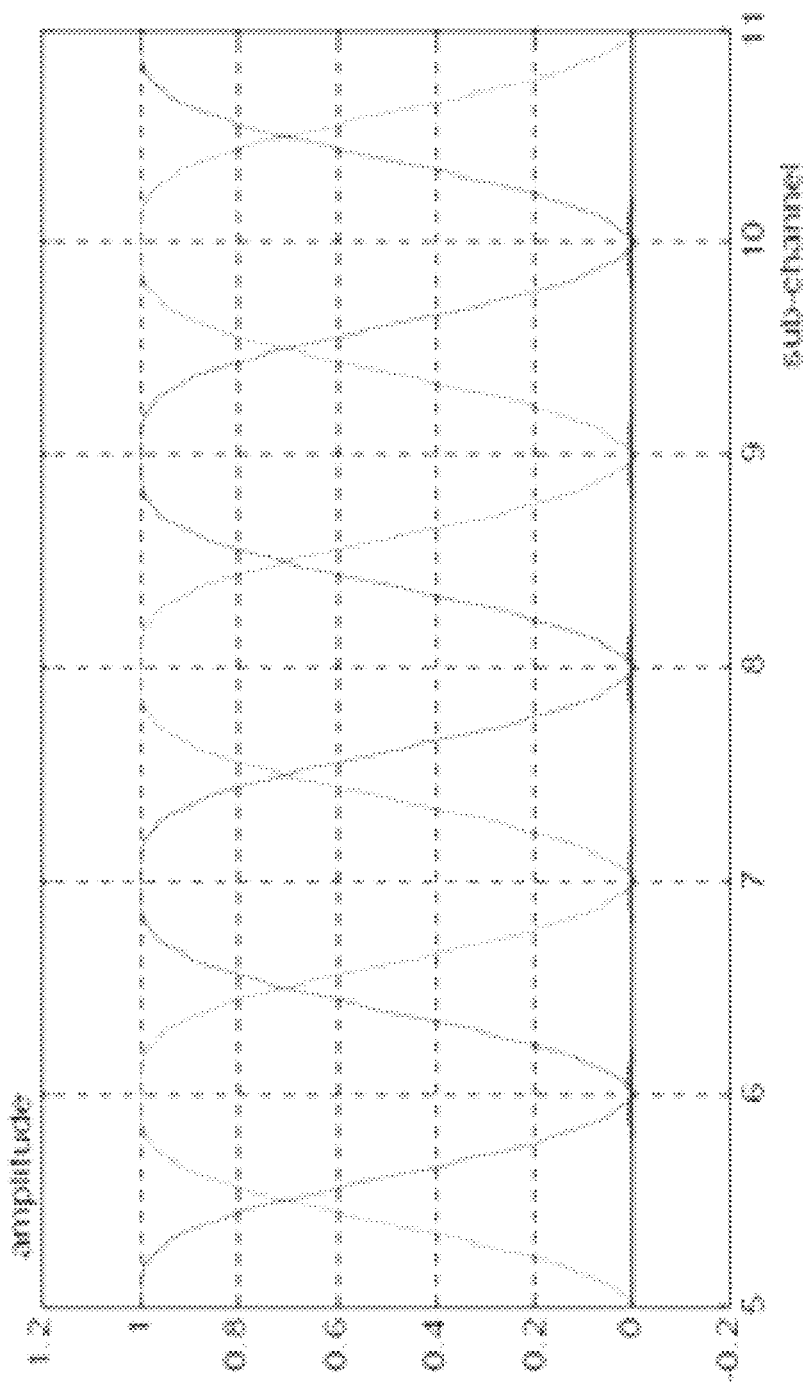
FIG. 2 is a graph showing the amplitude of signals on adjacent subcarriers in a filterbank multicarrier system.

In some filtered multi-carrier implementations, as illustrated in FIG. 2, the signals on adjacent subchannels overlap with each other (i.e., are non-orthogonal). Since the filters are not orthogonal, there is interference between adjacent subcarriers. However, the interference in this case is limited to the adjacent subcarriers due to the attenuation provided by the filters for the non-adjacent subcarriers. As noted above, the adjacent carrier interference can be mitigated by using OQAM in combination with FBMC.

Figure 3:
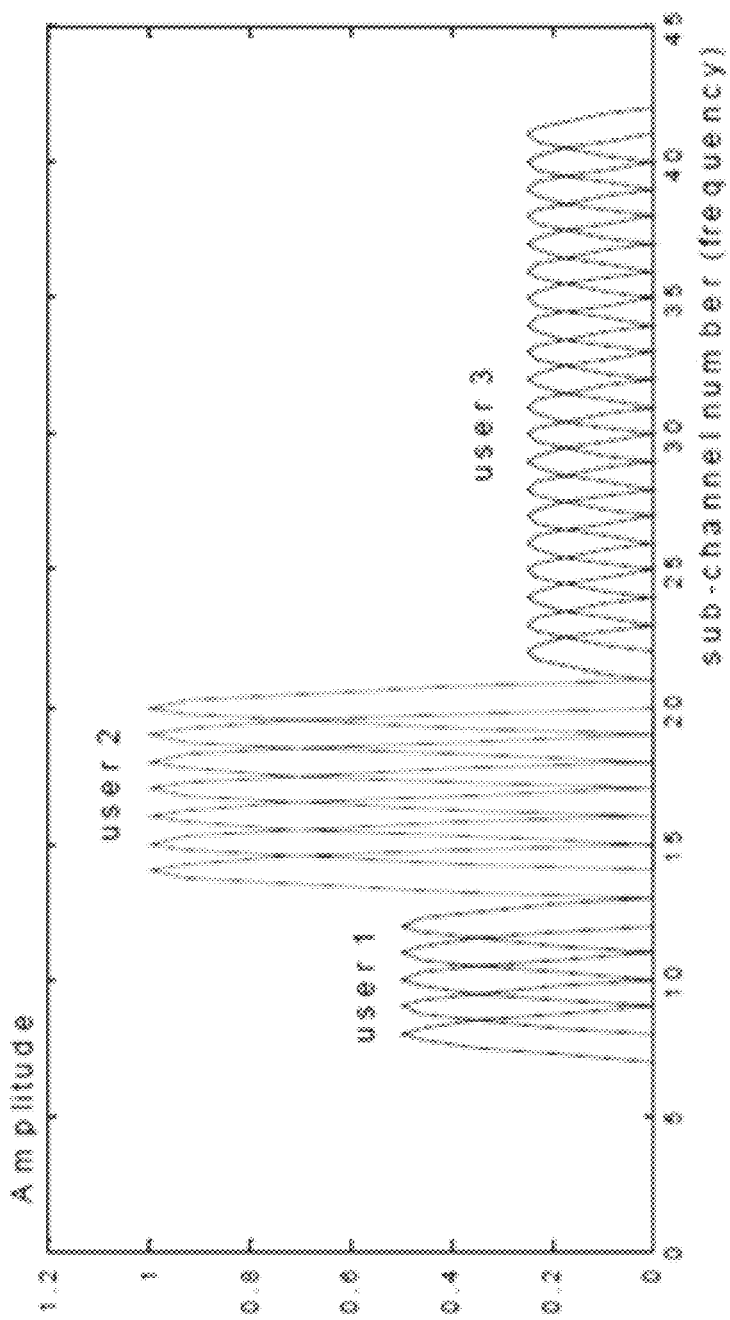
FIG. 3 is a graph showing the amplitude of signals in a multiple access system using filterbank multicarrier.

Because of the inherent attenuation provided by its filter bank, FBMC is particularly well suited as a multiple access method for the uplink in wireless communications systems. The main advantage of this method over SC-FDMA, for instance, relies on the relaxation of the timing alignment requirements. More specifically, SC-FDMA requires that signals from multiple transmitters be received within the duration of the cyclic prefix, which may typically be on the order of a few microseconds. This alignment ensures that orthogonality is maintained between signals transmitted from multiple users. The alignment may typically be realized by regularly sending timing advance values to each transmitter, using physical layer signaling (for instance, in a random access response) or MAC layer signaling. A user that is initially not aligned in time may have to first transmit on a physical random access channel (PRACH) that does not carry data and then receive a random access response from the network containing a timing advance value before transmission over a physical channel based on SC-FDMA, such as the physical uplink shared channel (PUSCH), can take place. Such procedure introduces latency in the data transmission process. FIG. 3 shows an example of the use of FBMC as a multiple access scheme. In this example, three users share the spectrum and do not interfere with each other. To ensure that there is no interference between users, one subcarrier may be reserved as a guard between each pair of adjacent users.

Figure 4:
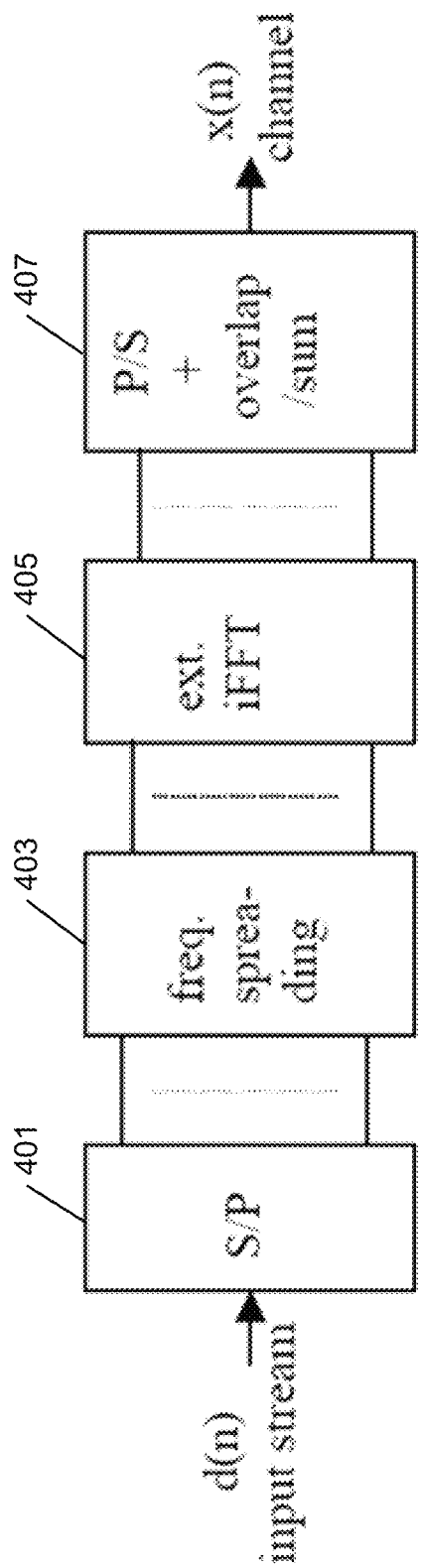
FIG. 4 is a high level block diagram of a transmitter using filterbank multicarrier.

The implementation of a filter bank in a UE naturally requires additional complexity due to the additional finite impulse response (FIR) filters involved for each subcarrier. FIG. 4 is a high level block diagram showing an exemplary filtered multi-carrier implementation approach based on an inverse Fast Fourier Transform (iFFT) approach. In the example of FIG. 4, the input stream is fed into a serial to parallel converter 401 and the parallel output is fed into a frequency spreading circuit 403. The parallel output of the frequency spreading circuit is fed into an inverse Fast Fourier Transform circuit 405. The data is then converted back to serial data and the output signal reconstructed by overlapping and adding the signal streams from the iFFT 405. Conceptually, when compared to a conventional OFDM modulation implementation, the main difference resides in the frequency spreading block 403 (the bank of filters) and the overlap/sum 407 at the output of the modulation chain.

Various techniques can be used to relax the timing requirements for OFDM. For purposes of this document, it will be assumed that the technique under consideration is based on filterbanks (or filtered multi-carrier) and has the following general characteristics: low or no inter-channel interference; and low sensitivity to frequency offsets/timing synchronization.

2 LTE PROTOCOL ARCHITECTURE

Figure 5:
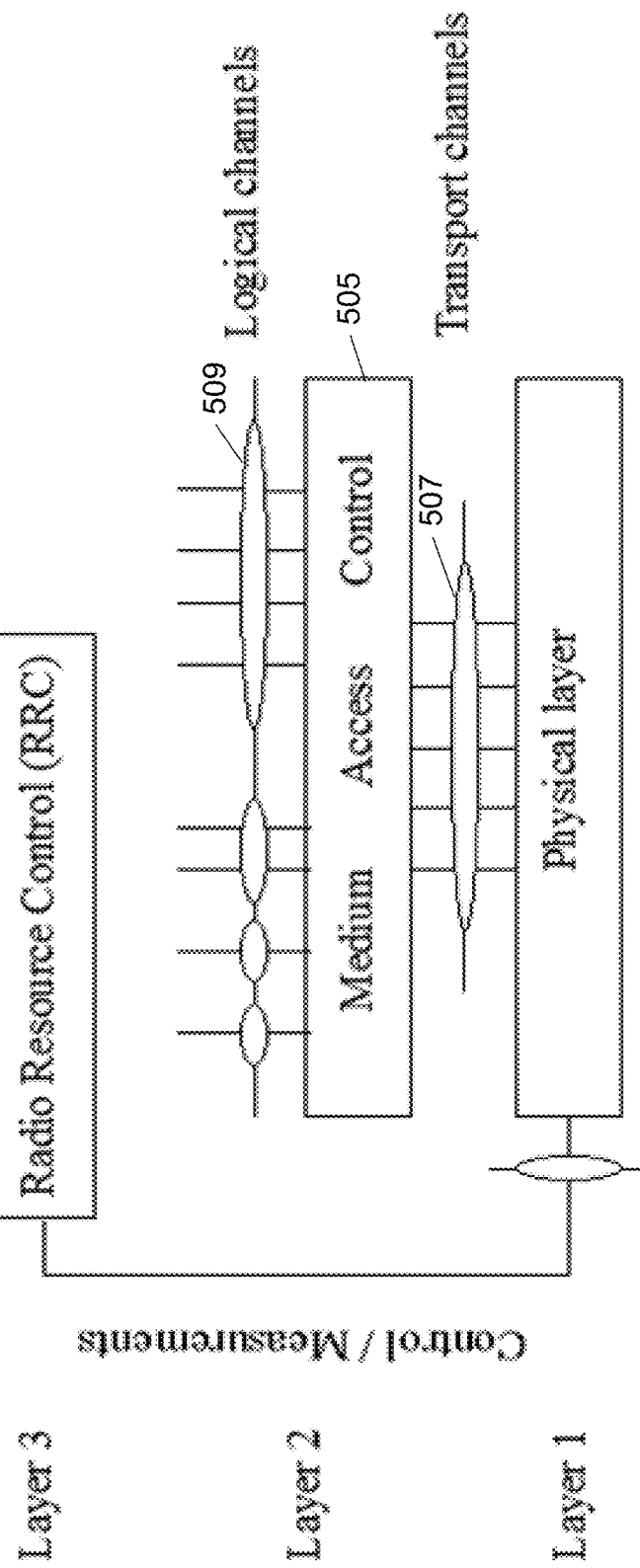
FIG. 5 is a block diagram showing the layer 1 through layer 3 architecture of an LTE communication system.

The conventional LTE L1-L3 layer protocol architecture is illustrated in FIG. 5. In this architecture, the logical channels 509 are multiplexed at the MAC layer 505 and the resulting transports channels 507 are mapped to the physical channels and sent over the air.

Figure 6:
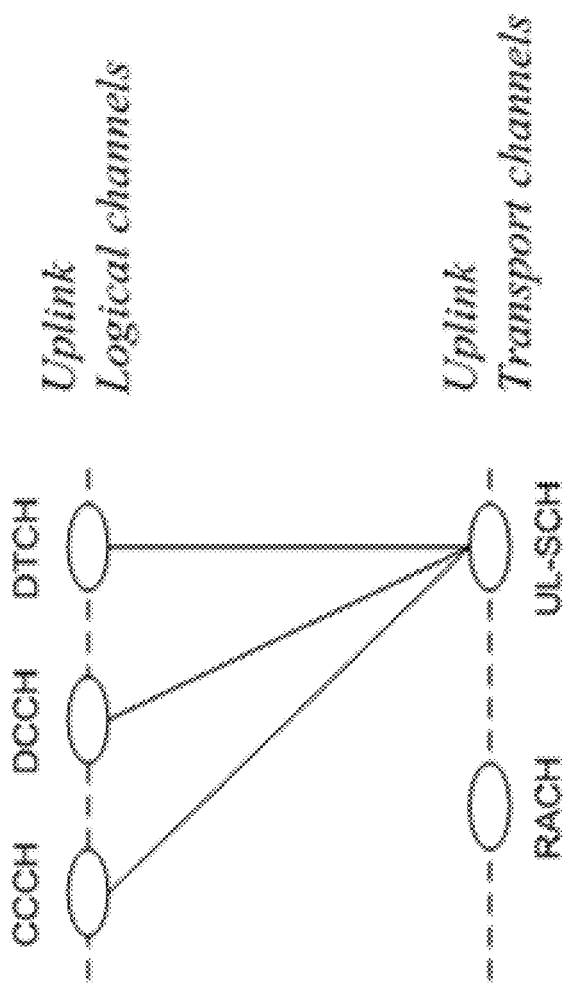
FIG. 6 is a diagram illustrating the mapping of the logical channels to the physical channels in LTE.

The mapping of the uplink logical channels to the uplink transport channels is illustrated in FIG. 6. It can be observed that, in LTE, all logical channels are mapped to the UL-SCH.

Figure 7:
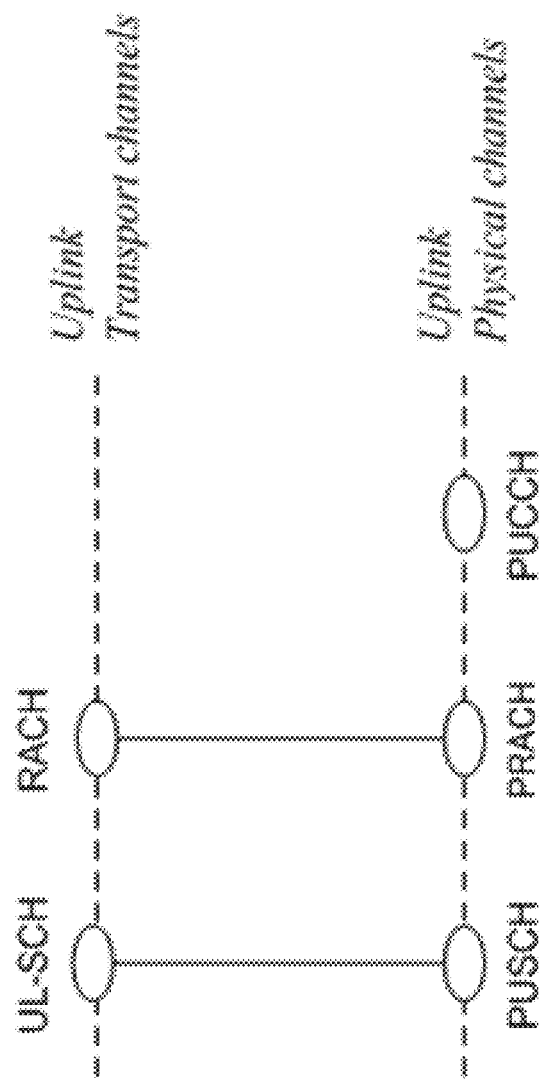
FIG. 7 is a diagram illustrating the mapping of the transport channels to the physical channels in LTE.

The mapping of transport channels onto physical channels is illustrated in FIG. 7. It can be observed that the UL-SCH transport channel, carrying all uplink logical channels, is mapped onto the PUSCH only. Thus in LTE, there is a single uplink transport and corresponding physical channel for the data on the uplink.

Part of the issue with OFDMA and SC-FDMA is the requirement of having tight timing control to maintain orthogonality. The first problem therefore consists of resolving the wireless access problem to relax the tight timing control requirement without introducing new feedback/control requirements. The second problem is to determine rules as to when to use this new access method as opposed to regular LTE access. Finally, the last problem is to provide mechanisms for further reducing latency of a first transmission packet.

Each of these issues presents several challenges. For instance, with regard to relaxing the timing requirements, methods and architectures to support access control without such tight timing control requirements are required. Depending on the access technique chosen, various new procedures need to be introduced to support legacy LTE systems at the PHY level.

With regard to rules to use this access method, while this new access method may provide advantages over existing LTE approaches, it may not be as efficient (at least in some ways) as existing LTE. The UE thus would benefit from rules to determine when to use the new access scheme versus another access scheme to ensure the most efficient operation both at the system level and for the UE.

Finally, with regard to reducing latency of initial data transmission, current LTE systems require a series of protocol exchanges between the UE and eNB before a UE may start transmitting data on the uplink. This protocol exchange increases latency and, in some cases, is inefficient. Thus, it is desirable to reduce the time for the UE to transmit the first data burst.

3 OVERVIEW

The following solutions are described in the context of an exemplary LTE system, but may be applicable to other technologies.

In accordance with one embodiment, a new physical channel is introduced that does not require tight synchronization for the UE to transmit information to the network.

This new channel will be herein referred to as the physical asynchronous uplink shared channel—PAUSCH. It should be understood that the solutions described below need not be limited to asynchronous, uplink, or shared channels.

4 HIGH-LEVEL UE ARCHITECTURE

Figure 8:
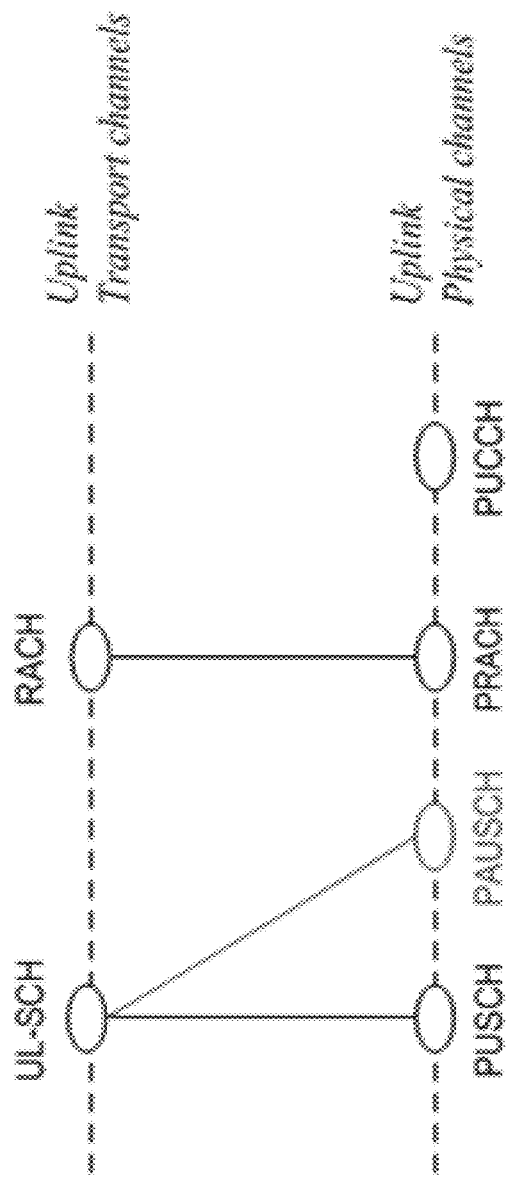
FIG. 8 is a diagram illustrating the mapping of the uplink transport channels to the uplink physical channels in accordance with one embodiment.

In a first embodiment with a single UL transport channel, the UE is configured with the conventional transport channel for the uplink, the UL-SCH, which, as shown in FIG. 8 may be mapped to either the conventional PUSCH or the new PAUSCH.

In this architecture, the MAC may be configured to route UL-SCH traffic on either the PAUSCH or the PUSCH depending on one or more factors. Solutions regarding mechanisms to determine the routing mechanism are described below.

Figure 9:
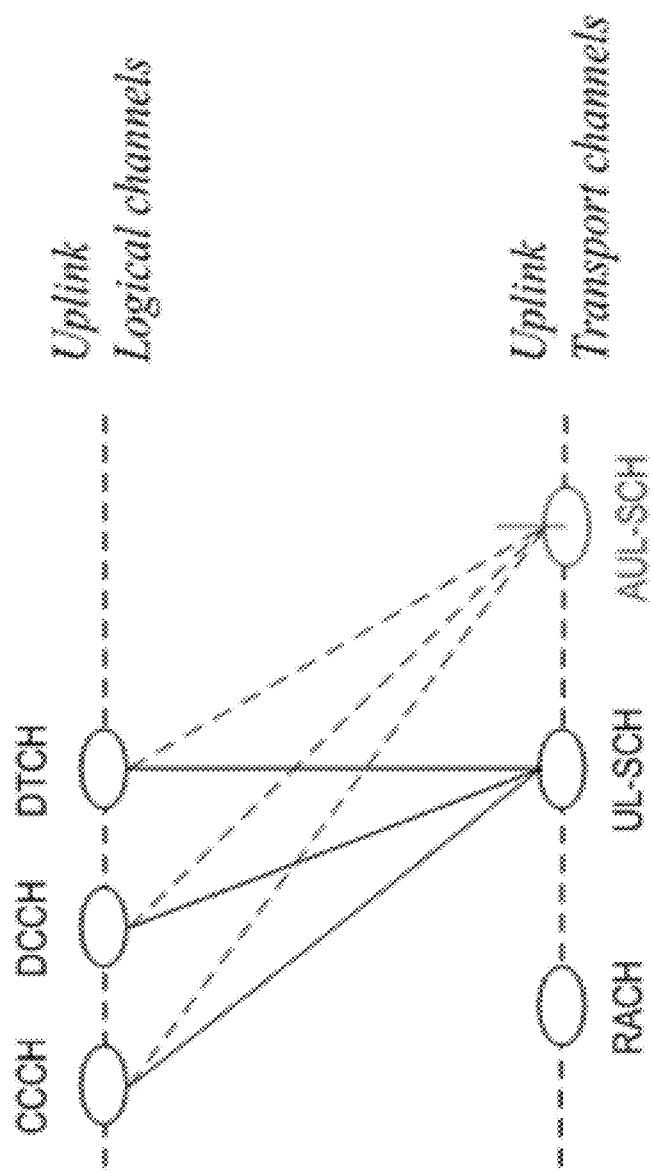
FIG. 9 is a diagram illustrating the mapping of the uplink logical channels to the uplink transport channels in accordance with a second embodiment.
Figure 10:
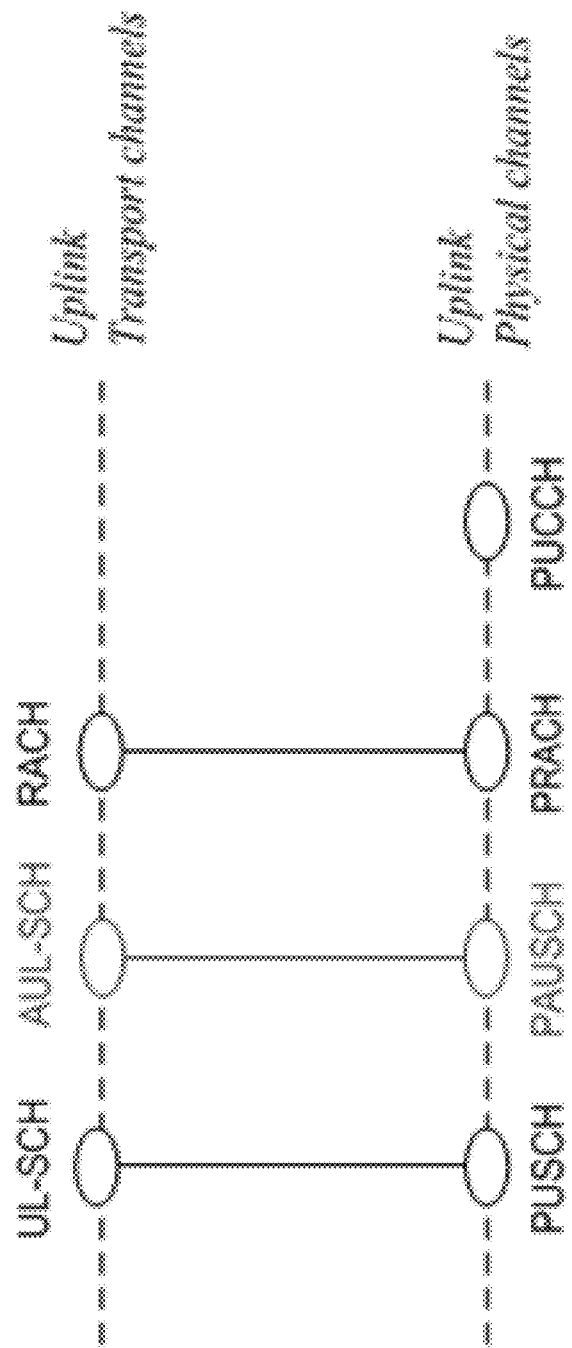
FIG. 10 is a diagram illustrating the mapping of the uplink transport channels to the uplink physical channels in accordance with the second embodiment.

In an alternative architecture with two uplink shared transport channels illustrated by FIGS. 9 and 10, the UE may be configured with a new asynchronous uplink shared transport channel (AUL-SCH) in addition to the conventional uplink shared channel (UL-SCH) which may be mapped directly to the PAUSCH.

The following sections describe detailed protocol aspects related to the proposed architectures. Note that, unless otherwise stated, the solutions described below are not restricted to either of the above proposed architectures.

5 L1/L2 ARCHITECTURE DESCRIPTION 5.1 PHY Aspects of Non-Orthogonal Signals (L1)
5.1.1 Physical Asynchronous Uplink Shared Channel (PAUSCH)

A UE may be configured to transmit data in the UL on a new PHY channel, the PAUSCH. Such a channel may allow the UE to transmit data without requiring that the received signal is aligned within a short time period with signals transmitted from other users. In certain embodiments, the PAUSCH does not utilize a timing alignment procedure. This is to be contrasted with the PUSCH in LTE, in which a timing alignment procedure typically is performed prior to the transmission of data in association with a new grant (although sometimes a new timing alignment is not necessary on the PUSCH for each grant, for instance, because a timing alignment timer associated with an earlier timing advance update has not expired yet). The PAUSCH may be designed to allow a different type of multi-carrier transmission than SC-FDMA in the UL, for example, a filtered multi-carrier technique, such as FBMC or GFDM. Using FBMC may remove the need for a UE to have proper timing alignment, given that the filter banks ensure that orthogonality between subcarriers will not be lost even when two UEs (possibly with different propagation delay characteristics to the eNB) use neighboring resource blocks for UL transmission.

In one solution, the UE may be configured with time-frequency resources that may be used for PAUSCH. Such time-frequency resources may overlap the PUSCH resource blocks or be located within the PUSCH resource blocks. For example, a PAUSCH may be comprised of one or multiple, possibly non-adjacent, Physical Resource Blocks (PRBs) in a subframe. In another example, a PAUSCH may be comprised of one or multiple PRBs over multiple subframes. In another solution, entire subframes may be used for PAUSCH. In another solution, multiple adjacent subframes may be configured as a single PAUSCH instance. In another solution, the PAUSCH may occupy a subset of symbols of a subframe. In another solution, the PAUSCH may occupy a subset of subcarriers within a subset of symbols of a subframe. For example, a PAUSCH may include the first 24 subcarriers of a first symbol within a subframe as well as the next 24 subcarriers of a second symbol within a subframe.

The structure of the PAUSCH may reuse that of legacy physical time-frequency resources. For example a subframe may be comprised of two time slots, each with 7 symbols. Each time slot may be 0.5 ms. A Resource block may be comprised of 12 subcarriers, with subcarrier spacing of 15 KHz. For non-orthogonal transmissions, a cyclic prefix may not be required to ensure orthogonality. A small guard period may still be required at the end (or beginning) of each symbol to reduce inter-symbol interference caused by multi-path fading. Such guard period may be smaller than a cyclic prefix used in LTE (for example, less than 4.7 microseconds). With lower cost associated with such a guard period, it may be possible for non-orthogonal transmissions to reduce the symbol time length. Similarly, it may be possible to increase the subcarrier spacing. For example, a subcarrier spacing for non-orthogonal transmission may be an integer multiple of the subcarrier spacing used for adjacent PUSCH and/or PUCCH transmissions. Similarly, the non-orthogonal symbol time length may be a divisor of that used for adjacent PUSCH and/or PUCCH transmissions.

An example of PAUSCH resources is a PRB of bandwidth 180 kHz and time duration 1 ms. In such a PAUSCH resource, the parameters may be subcarrier spacing of 30 KHz (i.e. 6 subcarriers) and symbol time of 35.7 microseconds (i.e. 28 symbols per PRB). Such a time symbol length may include a guard period. By increasing the subcarrier spacing, the complexity of the transceiver may be reduced.

The use of PAUSCH may require special subframe structure to prevent overlap with signals transmitted in a previous or subsequent subframe by other users that may be experiencing different propagation delays. For example, a new subframe supporting PAUSCH may include a set of symbols where no transmission is to occur. Such symbols can be used as guard symbols to ensure no inter-symbol interference with neighboring PUSCH transmissions. The number of guard symbols can be flexible and may be configured independently for each PAUSCH instance. For example, a PAUSCH located in a first set of subframes may use 1 guard symbol whereas a PAUSCH located in a second set of subframes may use 2 guard symbols. The symbols used as guard symbols may be located at the beginning of a subframe, the end of a subframe, or both. In a solution where the PAUSCH spans multiple adjacent subframes, the guard symbols may be located only at the beginning of the first subframe and/or end of the last subframe.

Demodulation Reference Signal for PAUSCH

For proper demodulation of the PAUSCH, the eNB may require demodulation reference signals to be transmitted by the UE. Such demodulation reference signal may be named asynchronous demodulation reference signal (or ADM-RS). The ADM-RS may be included in the set of resources where the PAUSCH is transmitted. In one embodiment, the PAUSCH may reuse the resource mapping of the PUSCH, and the ADM-RS may reuse the resource mapping of the UL DM-RS. In another solution, where a PAUSCH resource uses different symbol time length than PUSCH, the ADM-RS may require different locations. For example, if the PAUSCH uses 28 symbols per 1 ms, the ADM-RS may be evenly spaced in time and thus be included in every 7th symbol (i.e., if symbols start at 0, ADM-RS may be included in symbol number 6, 13, 20, 27). It is possible that the ADM-RS overhead for PAUSCH may be reduced as compared to that of UL DM-RS to PUSCH. One reason that it may be permissible to reduce ADM-RS overhead for PAUSCH is, for instance, PAUSCH may be reserved for use only with UEs with slowly varying channels (e.g. low mobility UEs) and/or may be for UEs with low delay spread (e.g. UEs near cell center). Low delay spread reduces the frequency-selectivity of the channel. In yet other embodiments, it may be permitted to use PAUSCH for all UEs, but some UEs (e.g. UEs with slowly varying channels) may be configured to use PAUSCH with a first AMD-RS density (e.g. reduced ADM-RS overhead), while other UEs (e.g. UEs with faster varying channels) are configured to use PAUSCH with a second ADM-RS density (e.g. greater ADM-RS overhead). Either the UE or a network infrastructure node (e.g., an eNB) may make the determination of the density of ADM-RS within a PAUSCH transmission (possibly based on the rate of change of the channel). Furthermore, the ADM-RS density may be semi-statically configured or may be dynamically indicated. Therefore, the ADM-RS may be only included in 2 of the PAUSCH symbols (for example, 2 out of 28 symbols) and/or may not span all the subcarriers of the PAUSCH. In one example, the ADM-RS may be placed in a first set of subcarriers in symbol 6, a second set of subcarriers in symbol 13, a third set of subcarriers in symbol 20, and a fourth set of subcarriers in symbol 27. In one method, the sets of subcarriers may be complementary or may be the same in some of the symbols.

The ADM-RS may reuse a ZC sequence and may use cyclic shifts to provide orthogonality with possible ADM-RS (or other) transmissions in neighboring cells. Furthermore, the ZC sequence may depend on a parameter specific to the PAUSCH resource. Such a parameter may be UE-specific or cell-specific and/or PAUSCH resource specific.

Acknowledgement of PAUSCH Transmission

In some embodiments, a UE may expect an ACK/NACK of transmissions on the PAUSCH. The PAUSCH may not require scheduling from an eNB, and thus the resources on which a UE may expect an ACK/NACK may not be tied to the scheduling grant. Furthermore, there may be a collision of UEs attempting to transmit on a single PAUSCH resource and therefore the ACK/NACK resources may not be simply tied to the PAUSCH resource, given that UEs will not be able to distinguish whether the ACK or NACK was intended for them or not.

A UE may be configured with a UE-specific Radio Network Temporary Identity (RNTI) to use for transmissions on PAUSCH. The UE may then expect an ACK/NACK in resources tied to the RNTI. In one solution, PHICH may be used for ACK/NACK and the PHICH resources used could be configured concurrently with the PAUSCH RNTI or may be implicitly derived from the PAUSCH RNTI.

In another solution, there may be a set of resources used for ACK/NACK of any transmission on a set of PAUSCH resources. For example, the resources used for ACK/NACK of a PAUSCH transmission may be a preconfigured subset of PHICH resources dedicated to PAUSCH transmissions. In this example, PAUSCH resources may be configured with an associated set of n PHICH resources. These n PHICH resources may be dedicated for PAUSCH ACK/NACK or may be chosen to allow some flexibility on the network side to also transmit ACK/NACK for legacy PUSCH transmissions. A UE that transmits UL data on PAUSCH may determine the exact resources on which to expect ACK/NACK based on a parameter of the PAUSCH transmission. For example, a UE may determine the appropriate PHICH resource (such as the PHICH group, the I or Q modulation and the orthogonal sequence) to expect ACK/NACK (possibly from a set of n pre-configured PHICH resources dedicated to PAUSCH transmissions) based on at least one of the following:

The first RB on which the UE transmitted PAUSCH;
The second RB on which the UE transmitted PAUSCH, for example, for the transmission of ACK/NACK for a second transport block using spatial diversity;
A parameter of the ADM-RS configuration, for example, the cyclic shift used;
A function of the RNTI used for PAUSCH transmission, for example, the orthogonal sequence used on the PHICH may be determine by a function of the RNTI, such as OCC=mod(RNTI,4).

In non-scheduled PAUSCH transmission, there may be a collision of PAUSCH transmissions by multiple UEs. In such a case, there may be confusion as to which PAUSCH transmission the ACK/NACK (possibly located in a PHICH-type resource) is responsive. In such a case, a UE may expect an UL grant for any retransmission on the PAUSCH. In another solution, the ACK/NACK resources used may be determined as a direct function of the RNTI used for PAUSCH transmission. For example, the ACK/NACK transmission may be scrambled using the appropriate UE-specific PAUSCH RNTI.

In another solution, a UE may indicate that it does not expect an ACK/NACK for a transmission using PAUSCH. Such indication may be provided in the configuration of the PAUSCH resources.

Configuration of PAUSCH

An eNB may broadcast the available PAUSCH resources in a System Information Block (SIB). In another embodiment, an eNB may configure PAUSCH on a per-UE basis via dedicated signaling. For example, a UE may be configured with a set of resources where it may either be scheduled with PAUSCH transmission or where it may autonomously use PAUSCH resources. In another solution, a UE may be instructed to use either PUSCH or PAUSCH in a DCI that grants UL resources. The Downlink Control Information (DCI) may include any of:

The PAUSCH resources to be used;
The Modulation and Coding Scheme (MCS) and/or Transport Block Size (TBS) values to be used;
The transmission power to be used; which may, for instance, be composed of an absolute value of power, a desired received power value, or a differential value with respect to a previous PAUSCH transmission;
Cyclic shift for the UL ADM-RS sequence generation;
The RNTI used for scrambling;
The resources on which the UE can expect ACK/NACK to be transmitted in the downlink.

In another solution, the UE may be assigned an RNTI for PAUSCH before being granted PAUSCH resources. This may be configured via higher layer signaling for example. In such a case, the UE may be provided with a list of search spaces on PDCCH for PAUSCH with which it may use RNTI to attempt to decode a UL DCI granting PAUSCH resources. Furthermore, the search space on which the UL DCI granting PAUSCH resources is located (as well as possibly the RNTI) may implicitly indicate to the UE some parameters of the PAUSCH grant. For example, a search-space and/or RNTI may be tied to a specific set of PAUSCH Resource Element (RE) resources (such as PRB location, bandwidth, subcarrier spacing, and symbol time length).

The PAUSCH may be used by UEs without requiring an UL grant. In such a case, the eNB may configure a UE with the capability of performing non-scheduled transmissions on the PAUSCH. Such configuration may be semi-static and may be done via higher layer signaling. Such a configuration may include any of:

The PAUSCH resources to be used (such resources may be shared by a group of UEs or may be UE-specific, and whether they are shared or not may be indicated to the UE so that appropriate UE behavior may be adopted in the scenario of a collision);

The set of MCS and/or TBS values that may be used by the UE for transmission on the PAUSCH;

The transmission power that may be used on the PAUSCH (this may be a maximum value, or it may be a desired reception power at the eNB—for the latter, the UE may use its estimate of the path loss to determine the appropriate transmission power to achieve such reception power at the eNB);

Cyclic shift for UL ADM-RS sequence generation;

The RNTI used for scrambling (the RNTI may be cell-specific and shared by all UEs configured with PAUSCH or it may be UE-specific);

The resources on which the UE can expect ACK/NACK to be transmitted in the downlink.

5.1.2 Random Access Channel with Non-Orthogonal Data Transmission

A UE without a valid timing advance value may wish to transmit data without requiring a full random access procedure thereby reducing the overall latency. According to an embodiment, to achieve this, a UE may append data to a random access message. The appending of data to a random access message may be implemented as an alternative to the PAUSCH-based embodiment discussed above. However, it also may be implemented in combination with PAUSCH, at least in the sense of using PAUSCH resources for transmitting the random access messages with the appended data asynchronously.

A UE may be configured with asynchronous PRACH (APRACH) resources on which it may perform random access with the transmission of data. The APRACH may be a new physical channel. Alternately, as mentioned immediately above, it may be implemented using PAUSCH resources (that is to say that the APRACH could be associated with the PAUSCH). The UE may use such a channel only to achieve the step of transmission of a single transport block. In one example, the UE may be configured to use the APRACH when first transmitting in a cell, for example, for transmitting the RRCConnectionRequest message when transmission of an initial NAS message (e.g., TRACKING AREA UPDATE REQUEST, SERVICE REQUEST, etc.) is requested by the UE. In one example use, the UE may be configured to append the initial NAS message to the RRC-ConnectionRequest message (instead of sending the message through RRCConnectionSetupComplete message). The UE in this case may be configured to use a set of default radio resource configurations.

In another method, the UE may also indicate to the eNB that it wishes to continue with the full random access procedure if the UE wishes to be granted a valid timing advance command in order to be considered connected and have the ability to transmit more data, possibly in an orthogonal legacy manner. APRACH may use a non-orthogonal multi-carrier scheme like FBMC. As such, a CP (Cyclic Prefix) may not be required. The APRACH region may still require guard periods to limit inter-symbol interference. Each symbol within an APRACH may have a guard symbol. Furthermore, a guard period may be added at the end of the last symbol and/or the beginning of the first symbol of APRACH.

Asynchronous PRACH (APRACH) Resource Configuration

APRACH resources may be configured similarly to PRACH resources. APRACH resources may, in fact, be a subset of conventional PRACH resources. In another solution, APRACH resources may cover an entire subframe and not be limited to the center six RBs. This may enable the UE to transmit greater amounts of data. In another solution, APRACH resources may be composed of two parts: a PRACH-like region for transmission of a preamble and another region for the transmission of data. For example, the PRACH region may occupy the center six RBs, while the remaining RBs may be for the transmission of data. In another solution, the data transmission region of the APRACH may use frequency hopping. For example, in one time slot, the data transmission region may include subcarriers whose index is less than the center six RBs in the first time slot and subcarriers whose index is greater than the center six RBs in the second time slot. The hopping pattern may depend on the cell ID and it may require other cell-specific variables that may be broadcast by the cell, for example in a SIB.

For robustness, the data may be repeated in each time slot and the data transmitted in the lower subcarriers of the first time slot may be repeated in the higher subcarriers in the second time slot. The data transmitted in the higher subcarriers of the first time slot may be repeated in the lower subcarriers of the second time slot.

The APRACH may use a similar time-frequency structure as the proposed PAUSCH. For example, the subcarrier spacing may be a multiple of PUSCH subcarriers and symbol time may be a divisor length of PUSCH symbol time. In another solution, the APRACH may use a similar time-frequency structure as PRACH, namely, the subcarrier spacing may be a divisor of PUSCH subcarriers, and the symbol time may be a multiple of PUSCH symbol time. For an APRACH that is comprised of two regions, a mix of the two types of time-frequency structures may be used. For example, the center six RBs may use subcarrier spacing that is a divisor of PUSCH subcarrier spacing and time length that is a multiple of PUSCH time length, whereas the remaining RBs may use subcarrier spacing that is a multiple of PUSCH subcarrier spacing and time length that is a divisor of PUSCH time length. In another embodiment, a subframe with APRACH may use two types of symbol lengths. In the first set of symbols, a symbol length (and possibly subcarrier spacing) may be used, while, in the remaining symbols, a second symbol length (and possible subcarrier spacing) may be used.

Composition of the APRACH

The APRACH may include a preamble. The preambles may be specific to APRACH or the APRACH may reuse the preambles configured for legacy PRACH. For example, the eNB may broadcast a list of preambles that should be used only for APRACH. Such a preamble may indicate to the network the identity of the UE. For example, a UE may be configured with a UE-specific preamble. In another solution, multiple UEs may share preambles and UE identity may be provided within the APRACH, for example by at least one of:

UE-specific RNTI

UE identity element within the APRACH

UE-specific sequence of a demodulation reference signal used within the APRACH.

UE-specific APRACH resources.

The preamble may be transmitted in a pre-configured portion of the APRACH. For example, the preamble may use a similar structure to that used for PRACH and may be located in the center six RBs. In another solution, the preamble may be transmitted in a subset of symbols of the APRACH resource. For example, the first x symbols of the APRACH may include a preamble.

The data portion of the APRACH may use similar structure as that for the proposed PAUSCH. For example, the symbol duration may be shortened while the subcarrier spacing may be increased. Furthermore, the data portion of the APRACH may include ADM-RS or legacy UL DM-RS (Uplink Demodulation Reference Signal). The data portion may be included in a set of PRBs that is complementary of the subcarriers used for the preamble. In another solution, the data portion may reside in the n-x last symbols of a subframe of length n where the preamble is transmitted in the first x symbols.

Figure 11:
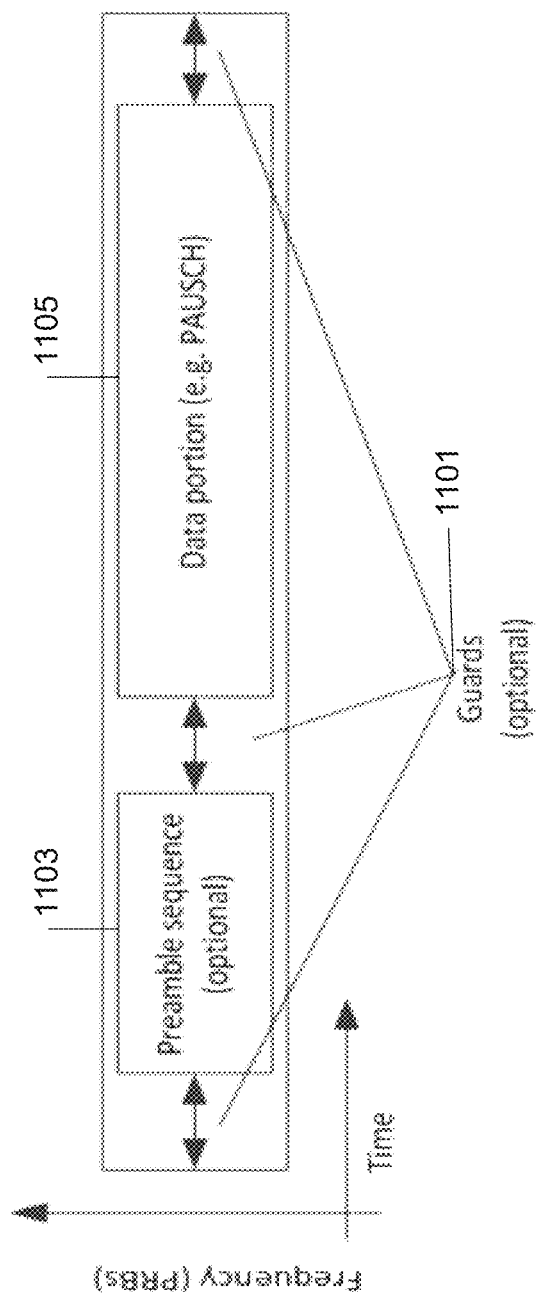
FIG. 11 illustrates a structure for an Asynchronous Physical Random Access Channel (APRACH) in accordance with an embodiment.

An example structure for the APRACH is illustrated in FIG. 11 and may comprise guard bands 1101 (optional), a preamble sequence 1103 (optional), and a data portion 1105.

The data portion may further be subdivided into two regions as illustrated in FIGS. 12A and 12B. The two regions could be separate symbols and/or PRBs within the APRACH resource. A first region 1203 may use pre-configured and fixed MCS. The first region may be used to deliver control information to the eNB for the data that is transmitted within the same APRACH. The second region 1208 may include the actual Transport Block. This concept is illustrated in FIGS. 12A and 12B, where, in FIG. 12A, the two portions are separated in time, and, in FIG. 12B, the two portions are separated in frequency.

The control data included in this region may include:
The identity of the UE;
The number of ports used;
The number of layers used;
The TBS and/or MCS of the included data;
The ADM-RS configuration;
The precoder used for the transmission of data (this may include the rank as well);
The power level used (for example, the UE may indicate if it has reached max power or not);
The RNTI used for scrambling the data;
The resource block allocation (for example, a UE may not need to use the entire APRACH resources for data transmission, and, in such a case, may indicate to the eNB the specific set of PRBs, or the total BW, or the symbols used for data transmission).

In some embodiments, the UE may be required to have valid identity in order to make use of the APRACH resources for transmission of data. As such, APRACH may be only used by UEs with valid C-RNTI. For example, a UE may have performed RA (Random Access) at an earlier time and its time alignment timer may have expired. As such, the UE may make use of its C-RNTI to use the APRACH resources.

In another solution, the APRACH may be used to indicate to the eNB that a specific set of resources are to be used for non-orthogonal UL transmission of data, for example, on a PAUSCH. In such a situation, the APRACH may include a preamble and control information in a similar manner as indicated above. Furthermore, the APRACH may point to a specific PAUSCH resource or to a specific portion of a PAUSCH resource. Such indication may use a PAUSCH index as configured by the eNB. In one solution, the UE may transmit the APRACH and the associated PAUSCH without any feedback from the eNB. In such a solution, the UE may be able to transmit the APRACH and the associated PAUSCH in the same subframe. In another solution, the UE may transmit the PAUSCH k subframes after the transmission of the APRACH, where k may be configurable and may depend on whether the system is FDD or TDD. In another solution, the UE may wait for an ACK for the APRACH before transmitting the associated data on the PAUSCH. In such a solution, the PAUSCH may be located in a subframe occurring k subframes after either the transmission of the APRACH or after the reception of the ACK for APRACH.

UE Expectations after Transmitting the APRACH

In some embodiments, a UE may not expect any response from the APRACH transmission. The data transmitted by the UE may have short-lived usefulness and may therefore not qualify for retransmission in the event of a collision or of poor reception by the eNB.

In other embodiments, the UE may expect an ACK/NACK from the eNB for the data portion of the APRACH. The ACK/NACK may be received similarly to that described hereinabove for PAUSCH. In another embodiment, the UE may expect an asynchronous random access response (ARAR) message. The UE may look for a DCI on the PDCCH using an RNTI that is associated with the APRACH (for example, an ARA-RNTI) within a pre-configured window. The DCI may indicate resources where the UE may find an ACK or NACK value linked to different preambles and/or UE identities that transmitted within a set of APRACH resources. In another solution, the existence of such an identity within the PDCCH may indicate to the UE an ACK. A lack of such identity may indicate a NACK. The UE may choose to perform retransmission upon detecting a NACK. In such a case, the control region of the APRACH may also include redundancy version as well as some information as to when the previous APRACH containing the same data was transmitted. In another embodiment, upon reception of a NACK (or lack of reception of an ACK), a UE may switch to performing legacy random access to transmit its data.

In yet another embodiment, a UE may use APRACH to transmit data and also to indicate to the eNB that it wishes to continue with the random access procedure in order to get valid timing advance. Such information may be included in the control region of the APRACH. Upon transmission of the APRACH, the UE may look for a random access response message from the eNB within a pre-configured window.

In view of the above discussion on the APRACH, some of the solutions described for the PAUSCH in this document may also be applicable to the APRACH. This is motivated by the observation that, in the above model, the data portion of the APRACH may consist of the PAUSCH. Hence, in this document, embodiments described in the context of the APRACH may also be applicable to the PAUSCH and vice-versa.

5.2 L2 Aspects

The PAUSCH may be used for transmission of data on the uplink with loose network control, whereas, in conventional LTE operations, the UE transmits data on the UL only when explicitly indicated by the network via the PDCCH. The PDCCH indicates the PUSCH transmission parameters to the UE.

With the new PAUSCH, the UE may be configured to initiate data transmission on its own without receiving authorization and timing alignment from the network. Rules for the UE to determine the transmission parameters must therefore be provided in order to allow efficient transmission.

The content of the initial transmission may, for example, be one or more of data payload from an application, an RRC connection request message, a scheduling request (e.g., embedded in a header sent along with the data), a Msg3 (which is currently limited in terms of payload).

The following sections provide solutions for the control of the PAUSCH transmission, primarily from a L2 perspective.

5.2.1 Solutions for UE Selection of Transmission Parameters

In conventional LTE operations, the UE is provided information for the UL transmission parameters. In a more specific example, the UE may be configured via the PDCCH with one or more of the following transmission parameters:

TBS;
Resource block assignment (BW);
Frequency hopping configuration;
Modulation and coding scheme;
Redundancy version;
Power control commands (TPC for scheduled PUSCH);
New data indication;
Carrier configuration (e.g., for carrier aggregation);
Channel State Information (CSI) request;
SRS request Some of these parameters are related to the MCS, BW, and power. Other parameters can be interpreted as HARQ control information. In one exemplary implementation of the PAUSCH, the UE may be configured to determine one or more of these parameters autonomously.

The UE may determine the transmission parameters based on rules that may be derived from the following assumptions/principles:

The UE controls and determine the transmission parameters (no dynamic control from PDCCH/ePDCCH);
Little to no intra-cell interference will be created by the transmission (i.e., the UE power is not limited by intra-cell interference considerations);
Inter-cell interference is mostly caused by UE transmission at cell-edge;
Link efficiency is maximized;
No CSI for UE-eNB link is available at the UE.

The UE may be configured to determine the transmission parameters based on one or more of the following principles.

In a first approach, the UE may be configured with one or more link efficiency parameters. This set of parameters may be configured, for example, via the SIBs and may comprise, for example, one or more of the following:

Code rate limit (Rlimit)
Modulation scheme limit (MCSmax);
TBS limit (TBSmax);
Maximum number of bits on PAUSCH per subframe per subcarrier (or per unit of bandwidth) ($N_{sc}^{max}$);
BW limit (BWmax)
Efficiency target/limit (Elimit, e.g., in bits/s/Hz);

The UE may be configured to use one or more of these link efficiency parameters in determining the PAUSCH Modulation and Control Scheme (MCS), bandwidth and power, for example.

The UE Determines the Transmit Power in Part by Ensuring Limited Interference to Neighbor eNB The UE may further determine the maximum transmit power spectral density based on its maximum power and the interference created at the neighbor cell, e.g., the closest neighbor cell. This can be achieved by the UE for example by measuring the path loss to the neighbor cell and ensuring that the transmitted power density is below a threshold determined based on the measured path loss to the neighbor cell and an optional offset configured by the network.

More specifically, the UE may be configured with a neighbor cell interference power density offset $\bar{P}_{ncip}$ (where the bar indicates that the variable is a power density value rather than an absolute power value). The UE maximum power for the PAUSCH of a given bandwidth M for interference to the neighbor cell, $P_{PAUSCH,M}^{nci}$, can be determined, for example, using this formulation (in dB scale):

$$P_{PAUSCH,M}^{nci} < \hat{P}_{L,nc} - (\bar{P}_{ncip} 10 \log_{10}(M))$$

where $\hat{P}_{L,nc}$ is the path loss estimate for the neighbor cell and M is the bandwidth of the PAUSCH (in the same unit of spectrum as $P_{ncip}$).

The UE also may determine the maximum power spectral density it can use considering the interference to the neighbor cell, for example, using this formulation (in dB scale):

$$\bar{P}_{PAUSCH,M}^{nci} < \hat{P}_{L,nc} - \bar{P}_{ncip}.$$

Thus, to avoid causing excessive interference to the neighbor cell, the UE may be configured to set the total PAUSCH power for a bandwidth M such that it does not exceed the limit imposed by the interference criterion, more specifically, such that:

$$P_{PAUSCH,M} < P_{PAUSCH,M}^{nci} - (\bar{P}_{PAUSCH}^{nci} - 10 \log_{10}(M)).$$

Thus, for a given PAUSCH bandwidth, M, the UE may determine the maximum power allowed that ensures that the neighbor eNB does not experience interference.

The UE may determine this maximum power for each neighbor eNB, a set of configured eNBs, or the eNB with the smallest measured path loss in the frequency used for transmission of the PAUSCH.

The UE Determines the Maximum TBS Based on Min of Max UE Power and Interference to Neighbor eNB The UE may be configured to determine the maximum Transport Block Size (TBS) it can transmit for the set of bandwidth configured (e.g., M=1, 2, 3, Mmax). For a given bandwidth, the UE may be configured to determine the maximum power for PAUSCH, for example as follows:

$$P_{PAUSCH,M}^{max} = \min(P_{max}, P_{PAUSCH,M}^{nci}),$$

where $P_{max}$ is the maximum UE power according to its power class (e.g., $P_{max}$ may be for example $P_{CMAX,c}(i)$ as defined in Technical Specification (TS) 36.213, or other variations of a maximum UE power). In one example, the UE takes into consideration possible simultaneous control channel power and Maximum Power Reduction (MPR) values in calculating $P_{max}$.

UE Determines Max TBS Based on Candidate BW and Maximum Power

In conventional LTE operations, the UE determines the PUSCH power for subframe i based on a number of parameters using the following formulation (see e.g., Section 5.1.1.1 of TS 36.213 v11.4.0):

$$P_{PUSCH,c}(i) = \min \begin{cases} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases}$$

where
$P_{CMAX,c}$ is the max transmit power,
M is the PUSCH bandwidth,
$P_{O\_PUSCH,c}(j)$ is the configured PUSCH power offset,
$PL_c$ is the estimated path loss to the serving cell,
$\alpha_c(j)$ is the configured path loss compensation factor,
$\Delta_{TF,c}(i)$ is a parameter accounting for the MCS, $f_c(i)$ is an additional power-control based parameter, and where the parameter j=0 if the PUSCH (re)transmissions corresponds to a semi-persistent grant, j=1 if the PUSCH (re)transmissions corresponds to a dynamic scheduled grant, and j=2 if PUSCH (re)transmissions corresponds to the random access response.

Note here that the PUSCH power dependence on the coding rate and modulation scheme is controlled via the $\Delta_{TF,c}(i)$ parameter, and more specifically as a function of the density of bits (i.e. bit per resource element (BPRE)).

For the PAUSCH, since there is no indication from the network as to the MCS and number of bits to be transmitted, the UE may be configured to determine these parameters autonomously. In one approach, the UE determines the number of bits for a given candidate bandwidth by first determining the highest BPRE that can be supported, for example, based on a similar (but reversed) equation as above for determining the PUSCH power. In one example, the UE may be configured to determine the headroom or power offset, $\Delta_{BPRE,M}$, associated with the transport format (i.e. BPRE/MCS) for the candidate bandwidth M as follows:

$$\Delta_{BPRE,M} = P_{PAUSCH,M}^{max} - \alpha_{PAUSCH} PL_c - 10 \log_{10} M - P_O,$$

where the partial path-loss compensation factor for the PAUSCH, $\alpha_{PAUSCH}$, and the power offset for the PAUSCH, $P_O$, is configured by the network, for example, via the SIBs. The UE is configured to measure the path-loss, $PL_c$, to the serving cell for example by using existing approaches.

The UE may be configured with multiple reference number of bits associated with a reference power offset (e.g., $(K_{O,M}, P_{O,M})_1$, where 1 is the index of the reference pair). Optionally, a default number of bits, $K_O$, supported for a baseline bandwidth (e.g., M=1) is configured. For example, in some cases, the following relation may hold: $K_O = K_{O,1}$.

The UE may further determine an additional number of bits available (i.e., in addition to $K_O$) for transmission for the candidate bandwidth M, for example, by extracting the actual number of bits associated with $\Delta_{BPRE,M}$. Assuming, for example, that $\Delta_{BPRE,M}$ follows the same construction as $\Delta_{TF,c}(i)$ (e.g., see section 5.1.1.1 in TS 36.213), which may be motivated, for example, by the waveform channel Shannon capacity formulation, then the number of bits associated with $\Delta_{BPRE,M}$, $K_{BPRE,M}$, may be expressed as $$K_{BPRE,M} = \frac{\log_2(10^{\Delta_{BPRE,M}/10} + 1)}{K_{s,PAUSCH}}$$

where $K_{s,PAUSCH}$ is a parameter that may be configured by the network.

The UE may then determine the total number of bits for the candidate bandwidth by adding the baseline value with the value determined from $\Delta_{BPRE,M}$, for example, as follows:

$$K_M = K_{BPRE,M} + K_O.$$

The UE may be configured to calculate $K_M$ for each value of M configured. Note that the values of $K_M$ may be expressed in terms of coded bits. Thus, the UE may be configured to translate that value into an actual number of information bits, for example, with a turbo encoder rate 1/3 using the following formulation:

$$TBS_M = \left\lfloor \frac{K_M}{3} \right\rfloor.$$

UE Determines which BW Provides the Support for the Desired TBS to be Transmitted and Uses the Least Amount of BW to Transmit it After computing the maximum number of bits supported for each candidate bandwidth M, the UE may be configured to determine the actual number of bits to transmit and the associated bandwidth. The UE may be configured to determine the number of bits to transmit based on the amount of data contained in the buffer for use with PAUSCH. For a given TBS supported by multiple bandwidths, the UE may be configured to select the smallest bandwidth possible to be as spectrally efficient as possible.

5.2.2 Solutions for Control of Access Transmissions/Retransmissions

The UE may be configured to transmit the PAUSCH one or more times, depending on the configuration. In some embodiments, the UE blindly repeats the transmission of the same data packet a configured number of attempts.

In other embodiments, the UE may be configured to retransmit the packet only if a NACK is received or DTX (i.e. no response) is detected from the eNB.

In one approach, the eNB echoes the UE RNTI or other identity associated with the UE (e.g., randomly generated UE ID) it detected associated with the PAUSCH resource that was used. The eNB may echo the UE identity for example over the PDCCH. In one example, the eNB transmits the UE identity on a PDCCH resource associated with the PAUSCH resource used by the UE. The UE may then determine if a collision occurred, for example, by determining if the received UE identity or RNTI associated with the resource that the UE used for transmission is its own.

In one example, in case of collision, the UE may be configured to retransmit the data at a later time (e.g., next PAUSCH occasion or random time in the next few PAUSCH occasions). In another example, the UE may be configured to revert to conventional transmission of the packet when this situation occurs.

In another example, the UE may be configured to increase the power of the transmission by a fixed amount when the UE receives an indication that the packet was not received properly (including lack of an indication that the packet was received properly), for example, when the UE receives a NACK and/or DTX.

The UE may be configured with a maximum number of attempts, after which it may either drop the packet or transmit it using the conventional approach.

5.2.3 Solutions for Control Processing of Control Information 5.2.3.1 Solutions for UE Measuring and Reporting Estimated Transmission Errors In PAUSCH transmission, as opposed to conventional operations, the eNB is not scheduling the data, and, therefore, it has no knowledge as to the channel error or collision rate. The UE may thus be configured to measure and report the channel performance metric to the eNB. This approach allows the network to control the amount of radio resources allocated to the PAUSCH to ensure an appropriate quality level.

UE Calculates the Transmission Error Rate

The UE may thus, for each PAUSCH transmission, log the transmission and whether or not it was received correctly by the eNB (e.g., by monitoring the ACK/NACK on the appropriate channel). The UE may then be configured to calculate the average error rate (or, equivalently, the average success rate) for a given time period and report it to the eNB. The averaging period may be configured by the network.

The UE may also be configured to determine the collision rate. For each PAUSCH transmission, the UE may log the transmission and whether or not it collided with another transmission (e.g., by reading the RNTI associated with the chosen resource as echoed by the eNB). The UE may then be configured to calculate the average collision rate for a given time period and report it to the eNB. The averaging period may be configured by the network.

UE Reports PAUSCH Performance Metrics

The UE may be configured to report the error rate based on one or more of the following triggers:
By request of the eNB (e.g., order or RRC signal);
Periodically;
When average error rate reaches a certain threshold;
When the number of successive errors reaches a certain threshold;

The UE may be configured to report the error rate measured using one or more of these example approaches:
In the MAC header for PAUSCH transmission;
Using an RRC measurement report (e.g., transmitted using PAUSCH or conventional methods);
Using a Non-Access Strata (NAS) message.

5.2.3.2 Solutions for Transmitting Control Information to the eNB

The UE may be configured to transmit, along with conventional information (e.g., data from higher layers), additional information for control of the PAUSCH operations or for feedback to support PDSCH operation. The UE may transmit in the MAC header new information, including one or more of the following exemplary information elements:
Indication to request access to the UL-SCH (and thus get a timing advance from the eNB);
Buffer information, e.g., buffer status report, (BSR), for example:
  A field in the BSR may carry buffer information related to logical channels (logical channel group) mapped to the PAUSCH;
  A flag indicating whether or not data suitable for PAUSCH is available;
Scheduling request.
UE identity (e.g., C-RNTI, or other identity)
Channel state information (CSI)
HARQ feedback in support of PDSCH The physical channel processing for CSI and HARQ A/N may be performed in a manner similar to the processing for the transmission of this information in PUSCH.

6 SOLUTIONS FOR UE SELECTION OF TRANSMISSION MECHANISM

The following paragraphs describe solutions that a UE may use (possibly in combination) to determine whether to transmit a transport block (from UL-SCH or UL-ASCH) or uplink control information (such as CSI, scheduling request, or HARQ feedback) using conventional PUSCH techniques, or using an asynchronous physical channel such as PAUSCH or APRACH such as disclosed herein. This determination is referred to as "transmission mechanism" in the following discussion. Some or all of these solutions may also be applicable to the determination of properties to use for the transmission of PAUSCH or APRACH. In the following, a transmission mechanism that makes use of an asynchronous physical channel such as PAUSCH or APRACH is referred to as a "reduced latency transmission mechanism", while a transmission mechanism that makes use of legacy channels is referred to as a "legacy transmission mechanism".

It is understood that transmission using PUSCH may only take place in a subframe for which a non-zero grant is available. Similarly, transmission using PAUSCH (or APRACH) may only take place in a subframe where a PAUSCH (or APRACH) resource is available. On the other hand, the determination of the transmission mechanism may take place at a different (earlier) time.

For instance, the determination of the transmission mechanism may take place when any of the following occurs:
When UL data becomes available for transmission in the RLC entity or the PDCP entity (such data will hereafter be referred to as "outstanding data");
When a buffer status report is triggered due to UL data arrival;
When a scheduling request is triggered;
When a resource for PAUSCH is available;
When uplink control information needs to be transmitted;
When the UE receives a downlink physical channel, such as PDSCH, or when an assignment is received on a physical control channel (PDCCH or E_PDCCH) to receive PDSCH or another type of downlink physical channel, which may require transmission of HARQ feedback.

In case the UE determines that PUSCH should be used for the transmission of some outstanding data but no grant is available, the UE may rely on existing mechanisms to indicate to the network the need for PUSCH resources. For instance, the UE may trigger transmission of scheduling request (possibly using a random access procedure) and expect to receive a grant in upcoming subframes.

In case the UE determines that PAUSCH should be used for the transmission of some outstanding data but the UE receives a grant for transmission over PUSCH before the resource for PAUSCH becomes available, the UE may do one of the following:
Use the PUSCH for the transmission of the data and refrain from using PAUSCH;
Ignore the grant and transmit at the next PAUSCH transmission opportunity anyway.

In case the UE determines, at a given time, that PAUSCH should be used for the transmission of some outstanding data according to a condition being satisfied, and that the condition is no longer satisfied before a resource for PAUSCH is available, the UE may revert to using PUSCH.

Transmission Mechanism May be Based on Property (QoS, Amount) of Outstanding Data to Transfer In some solutions, the transmission mechanism selected may be based on at least one property associated with the outstanding data to be transferred. A rationale for the use of such criteria is that PAUSCH or APRACH may be a channel best suited for the transmission of limited amounts of data that have stricter latency requirements.

The at least one property may include, for instance, one or more of:
The quantity of outstanding data to be transmitted from one or more logical channel(s);
At least one QoS parameter associated with the data, such as a guaranteed bit rate, a prioritized bit rate, a priority (such as logical channel priority), a type of service (such as conversational, interactive, background, streaming, etc.), or a latency requirement (such as a discard timer of a RLC entity);
Whether the data is to be transmitted for the first time by the MAC (or RLC) layer or is a retransmission (e.g., stored in HARQ entity).

Whether MAC control information, such as power headroom report or buffer status report, is to be transmitted (was triggered);

A type or identity of logical channel that the data is from, such as whether it is a DCCH or a DTCH;

Whether the data is from a data radio bearer or a signalling radio bearer.

In one example, data may be transferred using a reduced latency mechanism when the amount of outstanding data to be transmitted from one or more logical channel(s) does not exceed a threshold. The threshold may be for a single logical channel or for the total amount of data from a set of logical channels. The threshold may be dependent on the logical channel (or set thereof). The threshold may be zero for a given logical channel, i.e., data from this logical channel may not be transferred over PAUSCH.

In another example, data may be transferred using a legacy mechanism (e.g., over PUSCH) if the prioritized bit rate of the outstanding data is above a threshold (which may be zero). Data may be transferred using a reduced latency mechanism (e.g., over PAUSCH) if the discard timer of the RLC entity is below a threshold.

In another example, a HARQ retransmission of data may be transferred using the PUSCH, if PUSCH was used for the initial transmission, and using PAUSCH, if PAUSCH was used for the initial transmission.

In another example, if a buffer status report was triggered (and no grant for PUSCH is available), the buffer status report may be transmitted over PAUSCH.

In another example, data may be transferred using a reduced latency mechanism if some or all of the outstanding data is from a DCCH or from a CCCH.

In the above embodiments, the at least one threshold may be pre-determined or signaled from higher layers.

In the above embodiments, when a first portion of the outstanding data meets the condition(s) for transfer using a reduced latency mechanism but a second portion of the outstanding data meets the condition for transfer using the legacy transmission mechanism (or does not meet the condition for transfer using a reduced latency mechanism), one of the following may take place:

a) Only the first portion of the outstanding data is transferred using a reduced latency mechanism (the second portion may be transferred using PUSCH, possibly in a subsequent subframe when a non-zero grant becomes available);

b) Some or all of the second portion of the outstanding data may be transferred using a reduced latency mechanism in one or more subframes. The total amount of data transferred using a reduced latency mechanism in a subframe may be restricted to not exceed a threshold.

c) All of the outstanding data may be transferred using PUSCH (in one or more subframes) when a non-zero grant becomes available.

Transmission Mechanism May be Based on the Presence of Uplink Control Information to Transmit In some solutions, the transmission mechanism may be based on whether the UE is required to transmit uplink control information, or a certain type thereof, in a certain subframe. Uplink control information may comprise at least one of a Scheduling request, CSI feedback, and HARQ feedback.

For instance, the UE may determine that a reduced latency mechanism will be utilized for an uplink transmission in a subframe if HARQ feedback needs to be transmitted in this subframe. Possibly, the reduced latency mechanism may be selected only if the UE is not configured with other resources for the transmission of HARQ feedback (such as PUCCH). Possibly, the reduced latency mechanism may be selected only if the UE is not allowed to transmit over these resources due to expiration of a time alignment timer.

Transmission Mechanism May be Based on Estimated Latency of the Transfer

In some solutions, the transmission mechanism may be based on minimizing the estimated latency up to the initiation of the transfer or up to the estimated completion of the transfer using either mechanism, based on some assumptions.

For instance, if the reduced transmission mechanism is based on PAUSCH, the UE may determine the earliest times at which a transmission over PUSCH or PAUSCH can be initiated, respectively. The UE may estimate the time required for PUSCH as the sum of the time required for the transmission of a scheduling request and an assumed latency for the network to provide the grant. The latter parameter may be pre-determined or provided by higher layers. The time required for the transmission of the scheduling request may correspond to the number of subframes up to the next available PUCCH resource for a scheduling request, if available. If no PUCCH resource is available, the time may correspond to the number of subframes up to the next available PRACH resource plus an assumed latency for the reception of the random access response, which may itself be based on an assumed number of preamble transmissions.

The UE may estimate the time required for PAUSCH as the number of subframes until the next available PAUSCH resource.

Alternatively, the UE may determine the earliest times at which a transmission over PUSCH or PAUSCH can be completed, taking into account the time required until the first possible transmission over PUSCH or PAUSCH and the estimated time required for completing the transfer taking into account the amount of outstanding data for the set of logical channels for which this determination is applicable, or for all outstanding data. The estimated time required for completing the transfer over PUSCH or PAUSCH may be based on an assumed estimated data rate (throughput) over either channel. This estimated data rate may be provided by higher layers or derived from parameters provided by higher layers.

Transmission Mechanism May be Based on Implicit or Explicit Signaling

In some embodiments, the transmission mechanism to select may be explicitly indicated by the network using physical layer, MAC, or RRC signaling. For instance, the UE may receive a MAC control element indicating that no further transfer of data should take place over PAUSCH, either indefinitely or for an indicated period of time, or conversely that transfer of data may take place using a reduced latency mechanism.

In another embodiment, upon reception of a PDCCH order for RACH, the UE may determine that no further transmission using PAUSCH should take place until a timer started upon reception of the order expires.

In another embodiment, upon reception of grant for PUSCH (from PDCCH or E-PDCCH), the UE may determine that no further transmission using PAUSCH should take place until a timer started upon reception of the grant (or transmission of corresponding PUSCH) expires.

Transmission Mechanism May be Based on a RRC State or Current RRC Procedure

In some embodiments, the transmission mechanism selected may be based on the state of a protocol, such as the state of the RRC protocol. For instance, an UL transmission initiated from RRC idle (e.g., RRC connection request) may be transferred using PAUSCH, possibly conditioned on the presence of PAUSCH configuration on the system information. The transmission mechanism may also be based on whether the (control-plane) data is generated from RRC protocol in certain procedures, such as RRC connection request, RRC connection re-establishment, Measurement reporting or Proximity indication. Such control-plane information may be transferred using PAUSCH.

Transmission Mechanism May be Based on the State of a Timer

In some embodiments, the transmission mechanism may depend on whether a certain timer is running. For instance, a legacy transmission mechanism may be selected if a time alignment timer is running (i.e., not expired), while transmission over PAUSCH may be selected only if the time alignment timer is expired (and possibly additional conditions too).

In another exemplary embodiment, the use of PAUSCH may be permitted only if a first timer that was started upon a first transmission using PAUSCH is not expired. When such first timer expires, a second timer may be started during which use of PAUSCH may be prohibited for certain logical channels or conditioned on one or more other criteria. The durations of these timers may be signaled by the network by physical layer, MAC, or RRC signaling. The duration of the second timer may be randomly selected from a pre-determined distribution. This embodiment allows the network to limit the use of PAUSCH resource by a given UE.

In another exemplary embodiment, the use of PAUSCH may be permitted only if a timer started or re-started upon the last transmission using PUSCH is expired. This timer may consist of the inactivity timer used in DRX operation, if such timer is not re-started when data is transmitted using PAUSCH.

Transmission Mechanism May be Based on Transmission Performance Over PAUSCH and/or PUSCH In some embodiments, the selection of the transmission mechanism may be based on the performance of past transmissions, e.g., whether past transmissions using one channel have failed (e.g., UE received a NACK) or succeeded. In yet other embodiments, selection may be based on the transmission latency if HARQ is supported. Such solutions may be applicable if feedback on success or failure of transmissions is available. For instance, the UE may determine to use PUSCH for transmitting data if the number of consecutive transmission failures over PAUSCH has exceeded a pre-determined or signaled threshold. In another embodiment, the UE may determine to use PUSCH if the HARQ transmission delay becomes higher than a threshold. When this occurs, the UE may be prohibited from using PAUSCH while a timer that was started when the condition occurred has expired or after the time alignment timer restarted prior to the PUSCH transmission has expired.

When transmission of a transport block over PAUSCH has failed or when the UE has determined to stop using PAUSCH according to the above criteria, the UE may perform one or more of the following:

Discard the transport block;
  Attempt transmission of the transport block in the first subsequent PUSCH transmission, if the grant is sufficiently large, with padding bits added if necessary;
  The UE may be configured to transmit a scheduling request if the grant is not sufficient or is not available;
  Include control information (e.g., MAC control element) to indicate transmission failure over PAUSCH and associated transmission parameters.

Transmission Mechanism May be Based on Reception of Physical Downlink Channel

In some solutions, the transmission mechanism selected for an uplink transmission may depend on a property of a linked physical downlink channel transmission received in a previous subframe. The linkage between the uplink and the downlink transmission may be that the uplink transmission contains HARQ feedback for the downlink transmission, or that the downlink transmission contains a dynamic grant for the uplink transmission. The property(ies) of a physical downlink channel transmission used in the selection of a transmission mechanism may be at least one of:

A type of physical downlink channel carrying data from higher layers (PDSCH or a new type);
  A type of physical downlink control channel (PDCCH or E-PDCCH) carrying an assignment or a grant;
  A search space where the physical downlink control channel is decoded;
  A radio network temporary identity (RNTI) used for decoding the physical downlink control channel;
  An indication from a field of the downlink control information contained in the downlink control channel;
  A property of the PDSCH transmission such as the MCS, transport block size, new data indicator, or HARQ process identity;
  The timing of the reception of the physical downlink channel (at frame/subframe level).

For instance, if the UE decodes a downlink assignment or uplink grant with a first value of RNTI (such as C-RNTI), it may transmit the linked uplink transmission using a legacy transmission mechanism (PUCCH or PUSCH), while, if the UE decodes a downlink assignment or uplink grant with a second value of RNTI (such as L-RNTI), it may transmit the linked uplink transmission using a reduced latency transmission mechanism. A priority rule may be determined between the two mechanisms if a downlink assignment and/or uplink grant are received for both types of RNTI in the same subframe. For instance, in such a situation, the reduced latency transmission mechanism may have precedence.

The selection of the reduced latency transmission mechanism may possibly only occur if another condition is satisfied, e.g., that the time alignment timer is not running.

7 EXEMPLARY NETWORKS AND NETWORK COMPONENTS

Figure 13A:
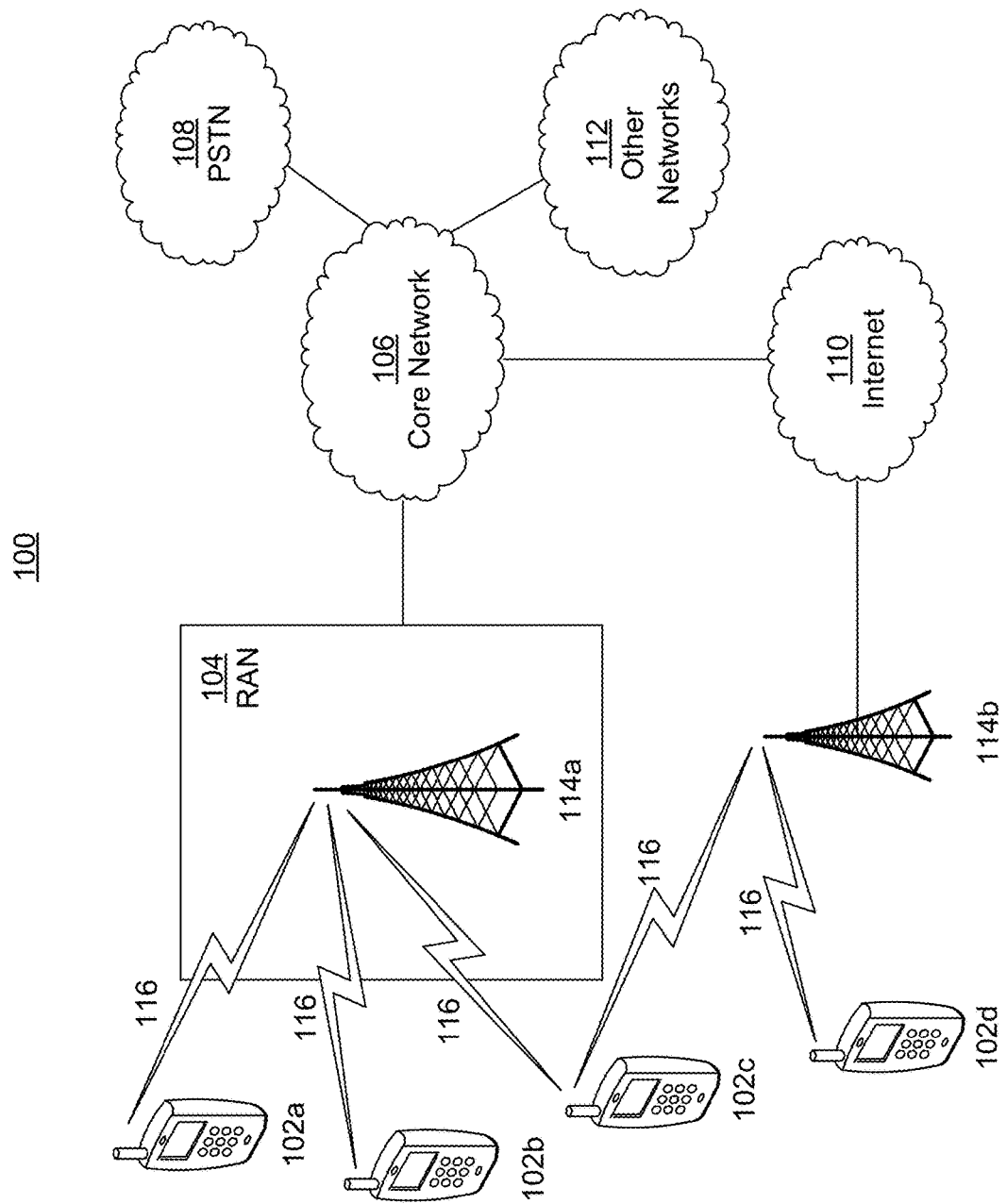
FIG. 13A is a system diagram of an example communications system in which one or more disclosed embodiments may be implemented.

FIG. 13A is a diagram of an exemplary communications system 100 in connection with which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 13A, the communications system 100 may include wireless transmit/receive units (WTRUs) 102*a*, 102*b*, 102*c*, 102*d*, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d* may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114*a* and a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the core network 106, the Internet 110, and/or the networks 112. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, etc. The base station 114*a* and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in one embodiment, the base station 114*a* may include three transceivers, i.e., one for each sector of the cell. In another embodiment, the base station 114*a* may employ multiple-input multiple output (MIMO) technology and, therefore, may utilize multiple transceivers for each sector of the cell.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 13A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 13A, the base station 114*b* may have a direct connection to the Internet 110. Thus, the base station 114*b* may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102*a*, 102*b*, 102*c*, 102*d*. For example, the core network 106 may provide call control, billing services, mobile location-based services, pre-paid calling, Internet connectivity, video distribution, etc., and/or perform high-level security functions, such as user authentication. Although not shown in FIG. 13A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102c shown in FIG. 13A may be configured to communicate with the base station 114a, which may employ a cellular-based radio technology, and with the base station 114b, which may employ an IEEE 802 radio technology.

Figure 13B:
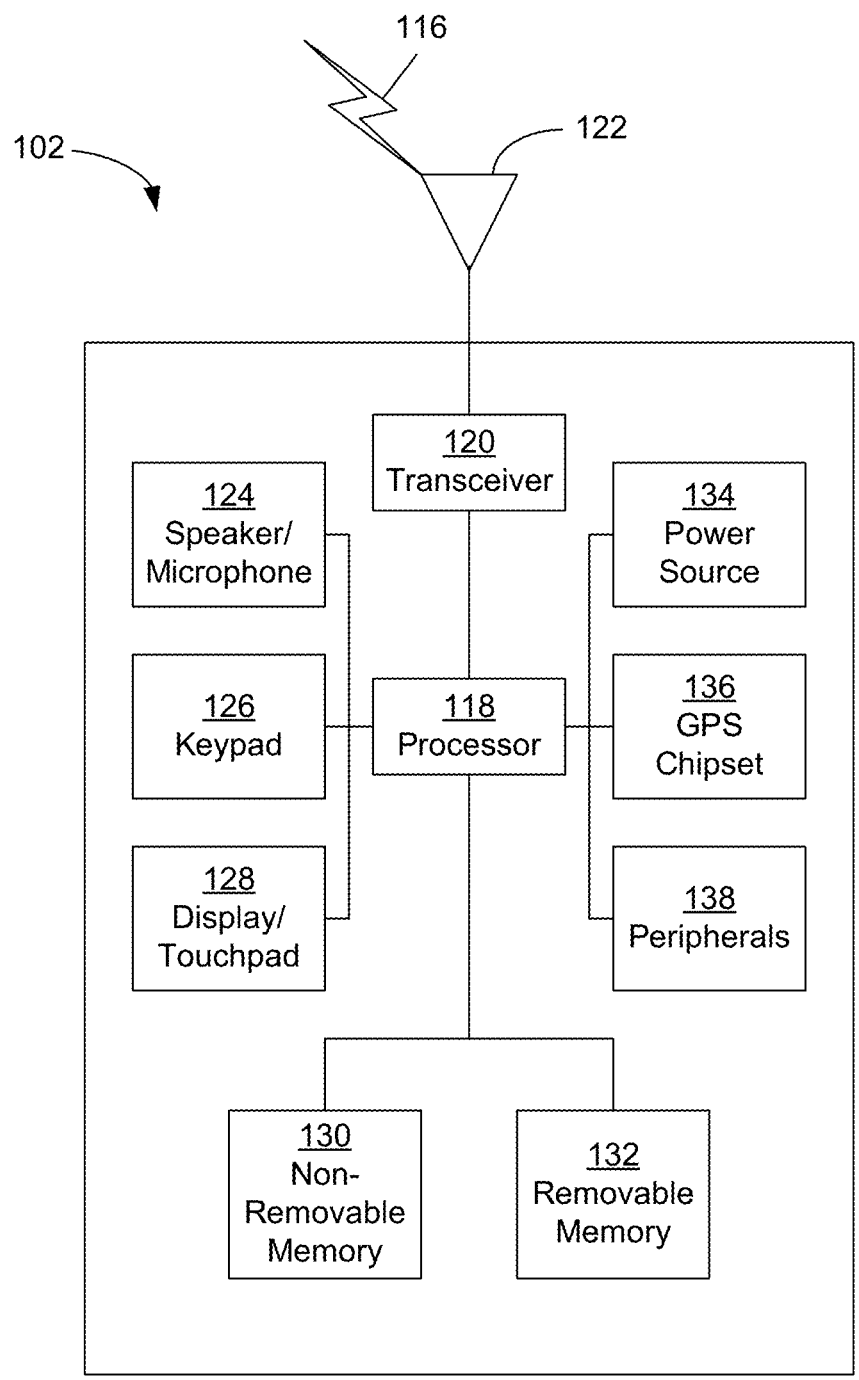
FIG. 13B is a system diagram of an example wireless transmit/receive unit (WTRU) that may be used within the communications system illustrated in FIG. 13A.

FIG. 13B is a system diagram of an example WTRU 102. As shown in FIG. 13B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 13B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 13B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 13C:
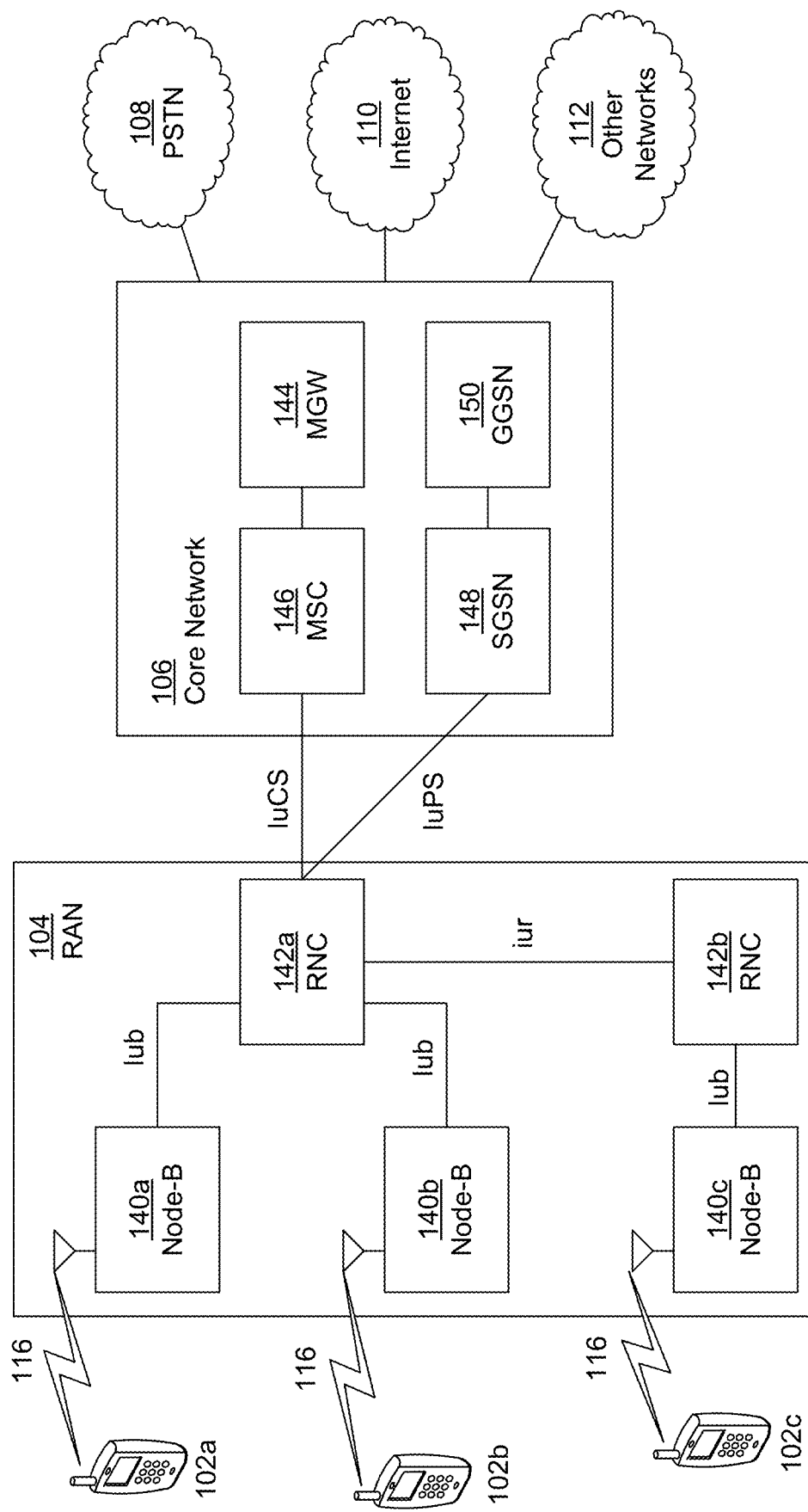
FIGS. 13C, 13D, and 13E are system diagrams of example radio access networks and example core networks that may be used within the communications system illustrated in FIG. 13A.

FIG. 13C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 13C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 13C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 13C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 13D:
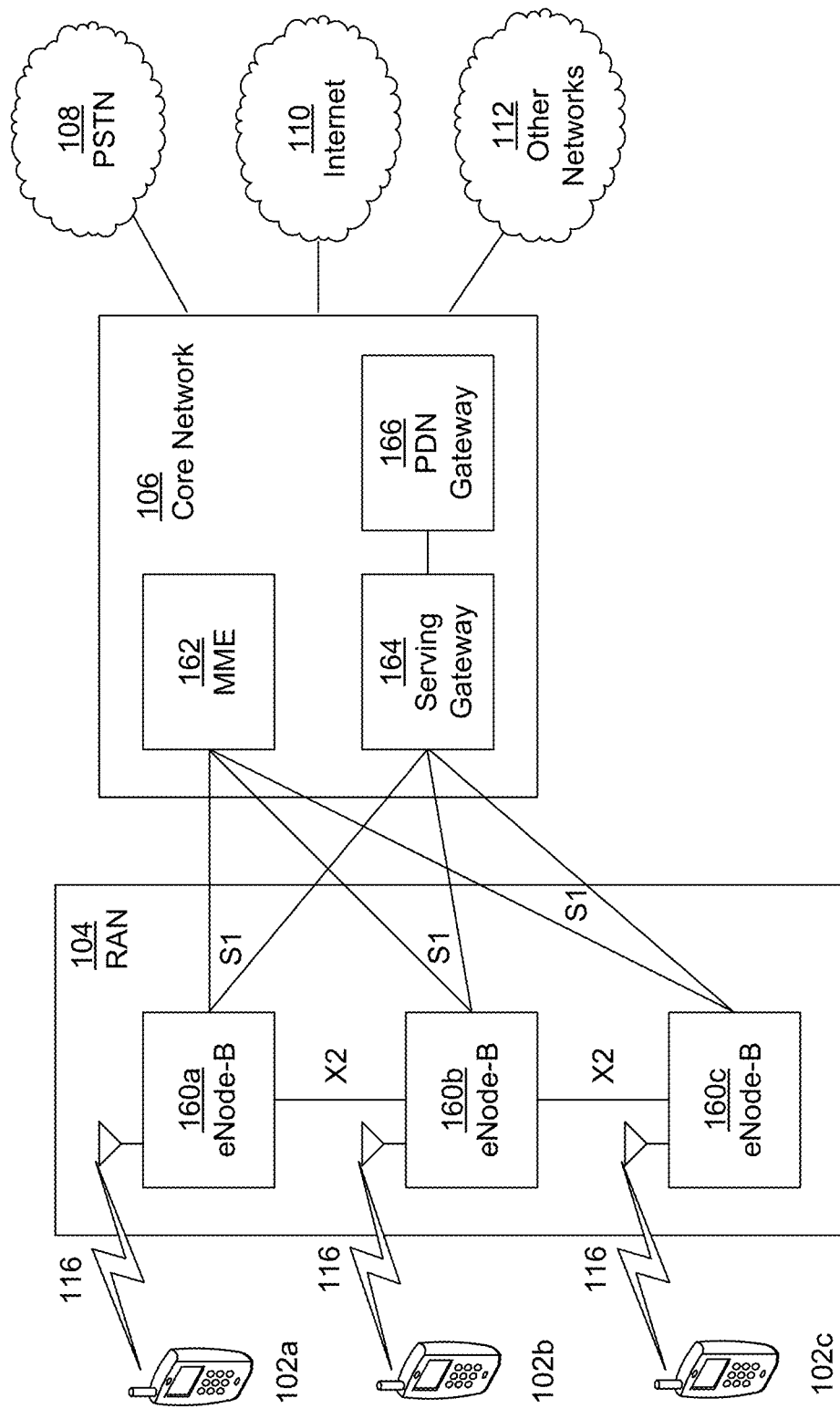

FIG. 13D is a system diagram of the RAN 104 and the core network 106 according to another embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 13D, the eNode-Bs 160a, 160b, 160c may communicate with one another over an X2 interface.

The core network 106 shown in FIG. 13D may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 160a, 160b, 160c in the RAN 104 via an Si interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 160a, 160b, 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 13E:
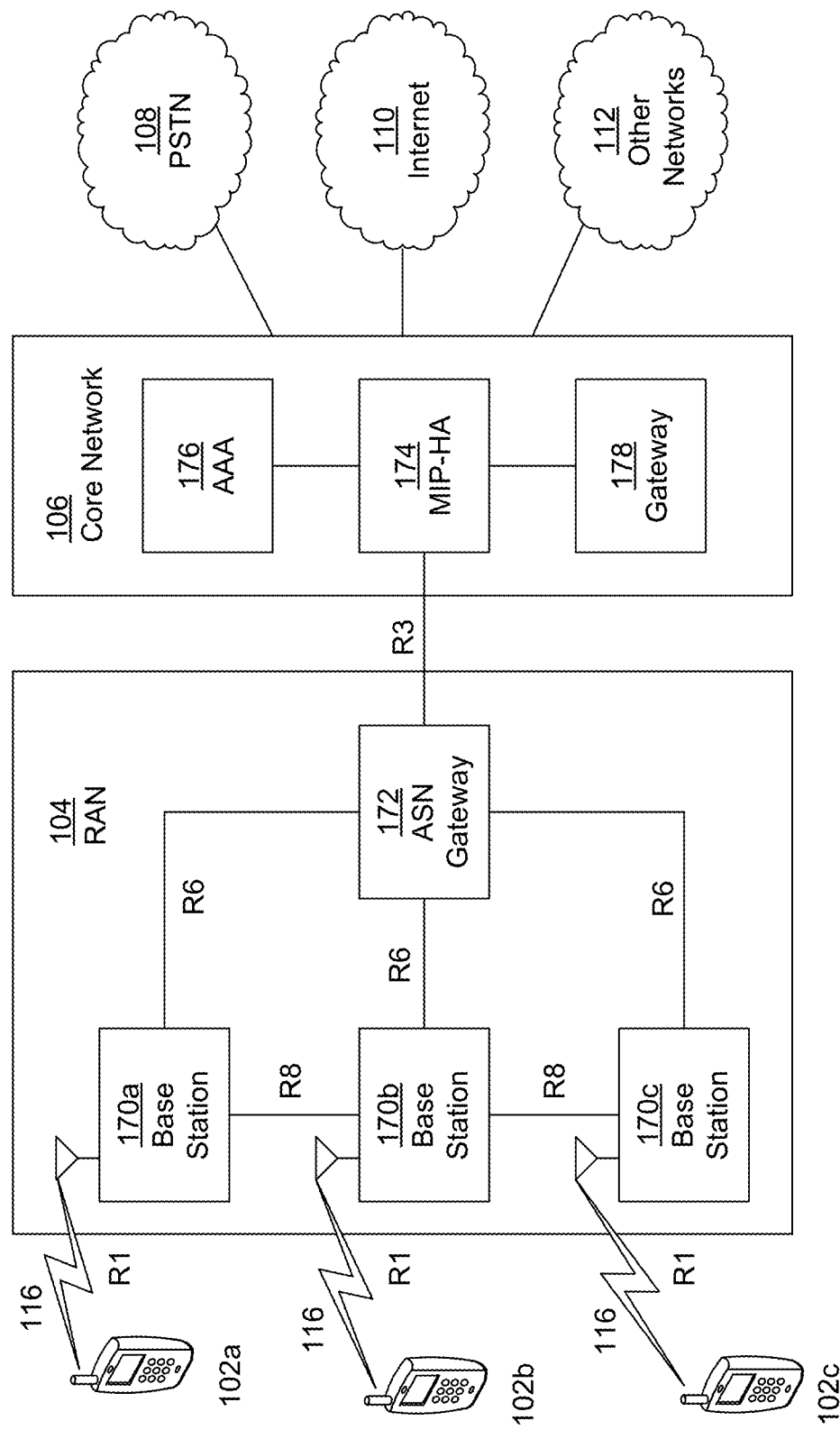

FIG. 13E is a system diagram of the RAN 104 and the core network 106 according to another embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 13E, the RAN 104 may include base stations 170a, 170b, 170c, and an ASN gateway 172, though it will be appreciated that the RAN 104 may include any number of base stations and ASN gateways while remaining consistent with an embodiment. The base stations 170a, 170b, 170c may each be associated with a particular cell (not shown) in the RAN 104 and may each include one or more transceivers for communicating with the WTRUs 102a, 102b, 102c over the air interface 116. In one embodiment, the base stations 170a, 170b, 170c may implement MIMO technology. Thus, the base station 170a, for example, may use multiple antennas to transmit wireless signals to, and receive wireless signals from, the WTRU 102a. The base stations 170a, 170b, 170c may also provide mobility management functions, such as handoff triggering, tunnel establishment, radio resource management, traffic classification, quality of service (QoS) policy enforcement, and the like. The ASN gateway 172 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 170a, 170b, 170c may be defined as an R8 reference point that includes protocols for facilitating WTRU handovers and the transfer of data between base stations. The communication link between the base stations 170a, 170b, 170c and the ASN gateway 172 may be defined as an R6 reference point. The R6 reference point may include protocols for facilitating mobility management based on mobility events associated with each of the WTRUs 102a, 102b, 102c.

As shown in FIG. 13E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 174, an authentication, authorization, accounting (AAA) server 176, and a gateway 178. While each of the foregoing elements are depicted as part of the core network 106, it will be appreciated that any one of these elements may be owned and/or operated by an entity other than the core network operator.

The MIP-HA 174 may be responsible for IP address management, and may enable the WTRUs 102a, 102b, 102c to roam between different ASNs and/or different core networks. The MIP-HA 174 may provide the WTRUs 102a, 102b, 102c with access to packet-switched networks, such as the Internet 110, to facilitate communications between the WTRUs 102a, 102b, 102c and IP-enabled devices. The AAA server 176 may be responsible for user authentication and for supporting user services. The gateway 178 may facilitate interworking with other networks. For example, the gateway 178 may provide the WTRUs 102a, 102b, 102c with access to circuit-switched networks, such as the PSTN 108, to facilitate communications between the WTRUs 102a, 102b, 102c and traditional land-line communications devices. In addition, the gateway 178 may provide the WTRUs 102a, 102b, 102c with access to the networks 112, which may include other wired or wireless networks that are owned and/or operated by other service providers.

Although not shown in FIG. 13E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

8 CONCLUSION

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. In addition, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WRTU), user equipment (UE), terminal, base station, Mobility Management Entity (MME) or Evolved Packet Core (EPC), or any host computer. The WRTU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A Wireless Transmit Receive Unit (WTRU) for transmitting payload data to a wireless network comprising:
    a transmitter;
    a receiver; and
    a processor configured to generate payload data for uplink transmission to the network;
    the processor further configured to select between transmitting the payload data to the network on a synchronous physical uplink channel or an asynchronous physical uplink channel and to transmit the payload data on the selected physical channel;
    wherein the synchronous physical uplink channel is a channel on which a timing alignment procedure is performed prior to transmitting the payload data and the asynchronous physical uplink channel is a channel on which a timing alignment procedure is not performed prior to transmitting the payload data.

2. The WTRU of claim 1 wherein the transmitter is configured to transmit the payload data on the asynchronous physical uplink channel without receiving a timing advance command from the network.

3. The WTRU of claim 1 wherein the transmitter is further configured to transmit the payload data on the asynchronous physical uplink channel using a filterbank multicarrier, FBMC, modulation scheme.

4. The WTRU of claim 1 wherein the transmitter is further configured to transmit on the asynchronous physical uplink channel without a cyclic prefix.

5. The WTRU of claim 1 wherein the transmitter is further configured to include asynchronous demodulation reference signals (ADM-RS) when transmitting on the asynchronous physical uplink channel.

6. The WTRU of claim 1 wherein the receiver is configured to receive indication of network resources available for the asynchronous physical uplink channel from the network in a System Information Block (SIB).

7. The WTRU of claim 1 wherein the receiver is further configured to receive from the network instructions whether to transmit the payload data via the synchronous physical uplink channel or the asynchronous physical uplink channel in Downlink Control Information (DCI) that grants uplink resources and wherein the processor is configured to select between transmitting the payload data to the network on the synchronous physical uplink channel or the asynchronous physical uplink channel based on the instructions.

8. The WTRU of claim 7 wherein the DCI includes at least one of: asynchronous physical uplink channel resources to be used; a modulation and coding scheme (MCS) to be used; a transport block size (TBS) to be used; a transmission power to be used; a cyclic shift for uplink ADM-RS sequence generation; the Radio Network Temporary Identifier (RNTI) used for scrambling; and indication of the resources on which the WTRU can expect an ACK/NACK to be transmitted in the downlink.

9. The WTRU of claim 1 wherein the transmitter is further configured to transmit the payload data on the asynchronous physical uplink channel without receiving a grant from the network.

10. The WTRU of claim 1 wherein the receiver is further configured to receive configuration information from the network for transmitting on the asynchronous physical uplink channel, wherein the configuration information comprises at least one of: asynchronous physical uplink channel resources to be used; indication of whether the asynchronous physical uplink channel resources are shared with other WTRUs; a set of MCS values that may be used by the WTRU for transmission on the asynchronous physical uplink channel; a set of TBS values that may be used by the WTRU for transmission on the asynchronous physical uplink channel; a transmission power that may be used on the asynchronous physical uplink channel; a cyclic shift for uplink ADM-RS sequence generation; the RNTI used for scrambling; an indication of resources on which the WTRU can expect ACK/NACK to be transmitted in the downlink.

11. The WTRU of claim 1 wherein the processor is further configured to determine transmission parameters for transmitting on the asynchronous physical uplink channel by determining a maximum transmit power for transmitting the data on the asynchronous physical uplink channel by measuring a path loss to a neighbor cell and selecting a transmit power density that is below a threshold based on the measured path loss to the neighbor cell.

12. The WTRU of claim 11 wherein determining the transmission parameters further comprises determining a maximum transport block size (TBS) for transmitting on the asynchronous physical uplink channel.

13. The WTRU of claim 1 wherein the processor is further configured to, responsive to selecting to transmit the data on the asynchronous physical uplink channel, append the payload data to a random access, RACH, message.

14. The WTRU of claim 1 wherein the selecting is performed responsive to at least one of: the payload data becoming available for transmission in a radio link control (RLC) entity or packet data convergence protocol (PDCP) entity; a buffer status report being triggered due to uplink data arrival; a scheduling request being triggered; and a resource for the asynchronous physical uplink channel being available.

15. The WTRU of claim 1 wherein the selection between transmitting the payload data on the synchronous physical uplink channel and transmitting the payload data on the asynchronous uplink channel is based on at least one of: a quantity of outstanding payload data to be transmitted from one or more logical channels; at least one quality of service (QoS) parameter associated with the payload data; whether the payload data is to be transmitted for the first time or is a retransmission; whether the payload data to be transmitted includes MAC control information; a type or identity of logical channel that the payload data to be transmitted is from; and whether the payload data is from a data radio bearer or a signaling radio bearer.

16. The WTRU of claim 1 wherein the selection between transmitting the payload data on the synchronous physical uplink channel and transmitting the payload data on the asynchronous uplink channel is based on whether a time alignment timer is expired.

17. The WTRU of claim 16 wherein the processor is further configured to:
   start a first timer upon a first transmission using the asynchronous physical uplink channel; and
   transmit the payload data on the asynchronous uplink channel if the first timer is unexpired and transmit the payload data on the synchronous uplink channel if the first timer is expired.

18. The WTRU of claim 17 wherein the processor is further configured to:
   start a second timer when the first timer expires; and
   transmit the payload data on the synchronous uplink channel if the second timer is unexpired and transmit the payload data on the asynchronous uplink channel if the second timer is expired.

19. The WTRU of claim 16 wherein the processor is further configured to:
   start a third timer upon the last transmission on the synchronous uplink channel; and
   transmit the payload data on the synchronous uplink channel if the third timer is not expired and transmit the payload data on the asynchronous uplink channel if the third timer is expired.

* * * * *